(12) United States Patent
Chui et al.

(10) Patent No.: US 7,304,784 B2
(45) Date of Patent: Dec. 4, 2007

(54) REFLECTIVE DISPLAY DEVICE HAVING VIEWABLE DISPLAY ON BOTH SIDES

(75) Inventors: Clarence Chui, San Mateo, CA (US); Mark W. Miles, San Francisco, CA (US)

(73) Assignee: IDC, LLC, San Francisco, CA (US)

( * ) Notice: Subject to any disclaimer, the term of this patent is extended or adjusted under 35 U.S.C. 154(b) by 36 days.

(21) Appl. No.: 11/187,129

(22) Filed: Jul. 21, 2005

(65) Prior Publication Data

US 2006/0077155 A1    Apr. 13, 2006

Related U.S. Application Data

(60) Provisional application No. 60/613,323, filed on Sep. 27, 2004.

(51) Int. Cl.
*G02B 26/00* (2006.01)
(52) U.S. Cl. ............... 359/290; 359/291; 359/292; 359/295; 359/298; 359/318; 345/85; 345/108
(58) Field of Classification Search ........... 359/223, 359/290–292, 295, 298, 318; 345/85, 108
See application file for complete search history.

(56) References Cited

U.S. PATENT DOCUMENTS

| | | |
|---|---|---|
| 2,534,846 A | 12/1950 | Ambrose et al. |
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,725,868 A | 4/1973 | Malmer, Jr. et al. |
| 3,813,265 A | 5/1974 | Marks |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |
| 4,389,096 A | 6/1983 | Hori et al. |
| 4,392,711 A | 7/1983 | Moraw et al. |
| 4,403,248 A | 9/1983 | te Velde |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |

(Continued)

FOREIGN PATENT DOCUMENTS

DE   4108966 A1   8/1992

(Continued)

OTHER PUBLICATIONS

Fan et al., "Channel Drop Filters in Photonic Crystals," Optics Express, vol. 3, No. 1, 1998.

(Continued)

*Primary Examiner*—Evelyn A. Lester
(74) *Attorney, Agent, or Firm*—Knobbe Martens Olson & Bear LLP

(57) ABSTRACT

An interferometric light modulating device having two viewing surfaces is provided. In some embodiments, the device can generate two distinct images, one on each side of the device, simultaneously.

23 Claims, 10 Drawing Sheets

U.S. PATENT DOCUMENTS

| | | | |
|---|---|---|---|
| 4,500,171 A | 2/1985 | Penz et al. | |
| 4,519,676 A | 5/1985 | te Velde | |
| 4,531,126 A | 7/1985 | Sadones | |
| 4,566,935 A | 1/1986 | Hornbeck | |
| 4,571,603 A | 2/1986 | Hornbeck et al. | |
| 4,596,992 A | 6/1986 | Hornbeck | |
| 4,615,595 A | 10/1986 | Hornbeck | |
| 4,662,746 A | 5/1987 | Hornbeck | |
| 4,663,083 A | 5/1987 | Marks | |
| 4,666,254 A | 5/1987 | Itoh et al. | |
| 4,681,403 A | 7/1987 | te Velde et al. | |
| 4,710,732 A | 12/1987 | Hornbeck | |
| 4,748,366 A | 5/1988 | Taylor | |
| 4,786,128 A | 11/1988 | Birnbach | |
| 4,790,635 A | 12/1988 | Apsley | |
| 4,856,863 A | 8/1989 | Sampsell et al. | |
| 4,857,978 A | 8/1989 | Goldburt et al. | |
| 4,859,060 A | 8/1989 | Katagiri et al. | |
| 4,900,136 A | 2/1990 | Goldburt et al. | |
| 4,900,395 A | 2/1990 | Syverson et al. | |
| 4,937,496 A | 6/1990 | Neiger et al. | |
| 4,954,789 A | 9/1990 | Sampsell | |
| 4,956,619 A | 9/1990 | Hornbeck | |
| 4,965,562 A | 10/1990 | Verhulst | |
| 4,982,184 A | 1/1991 | Kirkwood | |
| 5,018,256 A | 5/1991 | Hornbeck | |
| 5,022,745 A | 6/1991 | Zahowski et al. | |
| 5,028,939 A | 7/1991 | Hornbeck et al. | |
| 5,037,173 A | 8/1991 | Sampsell et al. | |
| 5,044,736 A | 9/1991 | Jaskie et al. | |
| 5,061,049 A | 10/1991 | Hornbeck | |
| 5,075,796 A | 12/1991 | Schildkraut et al. | |
| 5,078,479 A | 1/1992 | Vuilleumier | |
| 5,079,544 A | 1/1992 | DeMond et al. | |
| 5,083,857 A | 1/1992 | Hornbeck | |
| 5,096,279 A | 3/1992 | Hornbeck et al. | |
| 5,099,353 A | 3/1992 | Hornbeck | |
| 5,124,834 A | 6/1992 | Cusano et al. | |
| 5,136,669 A | 8/1992 | Gerdt | |
| 5,142,405 A | 8/1992 | Hornbeck | |
| 5,142,414 A | 8/1992 | Koehler | |
| 5,153,771 A | 10/1992 | Link et al. | |
| 5,162,787 A | 11/1992 | Thompson et al. | |
| 5,168,406 A | 12/1992 | Nelson | |
| 5,170,156 A | 12/1992 | DeMond et al. | |
| 5,172,262 A | 12/1992 | Hornbeck | |
| 5,179,274 A | 1/1993 | Sampsell | |
| 5,192,395 A | 3/1993 | Boysel et al. | |
| 5,192,946 A | 3/1993 | Thompson et al. | |
| 5,206,629 A | 4/1993 | DeMond et al. | |
| 5,212,582 A | 5/1993 | Nelson | |
| 5,214,419 A | 5/1993 | DeMond et al. | |
| 5,214,420 A | 5/1993 | Thompson et al. | |
| 5,216,537 A | 6/1993 | Hornbeck | |
| 5,226,099 A | 7/1993 | Mignardi et al. | |
| 5,228,013 A | 7/1993 | Bik | |
| 5,231,532 A | 7/1993 | Magel et al. | |
| 5,233,385 A | 8/1993 | Sampsell | |
| 5,233,456 A | 8/1993 | Nelson | |
| 5,233,459 A | 8/1993 | Bozler et al. | |
| 5,254,980 A | 10/1993 | Hendrix et al. | |
| 5,272,473 A | 12/1993 | Thompson et al. | |
| 5,278,652 A | 1/1994 | Urbanus et al. | |
| 5,280,277 A | 1/1994 | Hornbeck | |
| 5,287,096 A | 2/1994 | Thompson et al. | |
| 5,293,272 A | 3/1994 | Jannson et al. | |
| 5,296,950 A | 3/1994 | Lin et al. | |
| 5,305,640 A | 4/1994 | Boysel et al. | |
| 5,311,360 A | 5/1994 | Bloom et al. | |
| 5,312,513 A | 5/1994 | Florence et al. | |
| 5,323,002 A | 6/1994 | Sampsell et al. | |
| 5,324,683 A | 6/1994 | Fitch et al. | |
| 5,325,116 A | 6/1994 | Sampsell | |
| 5,326,430 A | 7/1994 | Cronin et al. | |
| 5,327,286 A | 7/1994 | Sampsell et al. | |
| 5,331,454 A | 7/1994 | Hornbeck | |
| 5,339,116 A | 8/1994 | Urbanus et al. | |
| 5,345,328 A | 9/1994 | Fritz et al. | |
| 5,355,357 A | 10/1994 | Yamamori et al. | |
| 5,358,601 A | 10/1994 | Cathey | |
| 5,365,283 A | 11/1994 | Doherty et al. | |
| 5,381,232 A | 1/1995 | Van Wijk | |
| 5,381,253 A | 1/1995 | Sharp et al. | |
| 5,401,983 A | 3/1995 | Jokerst et al. | |
| 5,411,769 A | 5/1995 | Hornbeck | |
| 5,444,566 A | 8/1995 | Gale et al. | |
| 5,446,479 A | 8/1995 | Thompson et al. | |
| 5,448,314 A | 9/1995 | Heimbuch et al. | |
| 5,452,024 A | 9/1995 | Sampsell | |
| 5,454,906 A | 10/1995 | Baker et al. | |
| 5,457,493 A | 10/1995 | Leddy et al. | |
| 5,457,566 A | 10/1995 | Sampsell et al. | |
| 5,459,602 A | 10/1995 | Sampsell | |
| 5,459,610 A | 10/1995 | Bloom et al. | |
| 5,461,411 A | 10/1995 | Florence et al. | |
| 5,474,865 A | 12/1995 | Vasudev | |
| 5,489,952 A | 2/1996 | Gove et al. | |
| 5,497,172 A | 3/1996 | Doherty et al. | |
| 5,497,197 A | 3/1996 | Gove et al. | |
| 5,499,037 A | 3/1996 | Nakagawa et al. | |
| 5,499,062 A | 3/1996 | Urbanus | |
| 5,500,635 A | 3/1996 | Mott | |
| 5,500,761 A | 3/1996 | Goossen et al. | |
| 5,506,597 A | 4/1996 | Thompson et al. | |
| 5,515,076 A | 5/1996 | Thompson et al. | |
| 5,517,347 A | 5/1996 | Sampsell | |
| 5,523,803 A | 6/1996 | Urbanus et al. | |
| 5,526,051 A | 6/1996 | Gove et al. | |
| 5,526,172 A | 6/1996 | Kanack | |
| 5,526,327 A | 6/1996 | Cordova, Jr. | |
| 5,526,688 A | 6/1996 | Boysel et al. | |
| 5,535,047 A | 7/1996 | Hornbeck | |
| 5,548,301 A | 8/1996 | Kornher et al. | |
| 5,551,293 A | 9/1996 | Boysel et al. | |
| 5,552,924 A | 9/1996 | Tregilgas | |
| 5,552,925 A | 9/1996 | Worley | |
| 5,559,358 A | 9/1996 | Burns et al. | |
| 5,563,398 A | 10/1996 | Sampsell | |
| 5,567,334 A | 10/1996 | Baker et al. | |
| 5,570,135 A | 10/1996 | Gove et al. | |
| 5,579,149 A | 11/1996 | Moret et al. | |
| 5,581,272 A | 12/1996 | Conner et al. | |
| 5,583,688 A | 12/1996 | Hornbeck | |
| 5,589,852 A | 12/1996 | Thompson et al. | |
| 5,597,736 A | 1/1997 | Sampsell | |
| 5,600,383 A | 2/1997 | Hornbeck | |
| 5,602,671 A | 2/1997 | Hornbeck | |
| 5,606,441 A | 2/1997 | Florence et al. | |
| 5,608,468 A | 3/1997 | Gove et al. | |
| 5,610,438 A | 3/1997 | Wallace et al. | |
| 5,610,624 A | 3/1997 | Bhuva | |
| 5,610,625 A | 3/1997 | Sampsell | |
| 5,614,937 A | 3/1997 | Nelson | |
| 5,619,059 A | 4/1997 | Li et al. | |
| 5,619,365 A | 4/1997 | Rhoades et al. | |
| 5,619,366 A | 4/1997 | Rhoads et al. | |
| 5,629,790 A | 5/1997 | Neukermans et al. | |
| 5,633,652 A | 5/1997 | Kanbe et al. | |
| 5,636,052 A | 6/1997 | Arney et al. | |
| 5,636,185 A | 6/1997 | Brewer et al. | |
| 5,638,084 A | 6/1997 | Kalt | |
| 5,638,946 A | 6/1997 | Zavracky | |
| 5,641,391 A | 6/1997 | Hunter et al. | |
| 5,646,768 A | 7/1997 | Kaeiyama | |

| | | | |
|---|---|---|---|
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,661,591 A | 8/1997 | Lin et al. |
| 5,665,997 A | 9/1997 | Weaver et al. |
| 5,673,139 A | 9/1997 | Johnson |
| 5,683,591 A | 11/1997 | Offenberg |
| 5,703,710 A | 12/1997 | Brinkman et al. |
| 5,710,656 A | 1/1998 | Goosen |
| 5,726,480 A | 3/1998 | Pister |
| 5,739,945 A | 4/1998 | Tayebati |
| 5,740,150 A | 4/1998 | Uchimaru et al. |
| 5,745,193 A | 4/1998 | Urbanus et al. |
| 5,745,281 A | 4/1998 | Yi et al. |
| 5,751,469 A | 5/1998 | Arney et al. |
| 5,771,116 A | 6/1998 | Miller et al. |
| 5,784,190 A | 7/1998 | Worley |
| 5,784,212 A | 7/1998 | Hornbeck |
| 5,786,927 A | 7/1998 | Greywall et al. |
| 5,793,504 A | 8/1998 | Stoll |
| 5,808,780 A | 9/1998 | McDonald |
| 5,808,781 A | 9/1998 | Arney et al. |
| 5,818,095 A | 10/1998 | Sampsell |
| 5,825,528 A | 10/1998 | Goosen |
| 5,835,255 A | 11/1998 | Miles |
| 5,835,256 A | 11/1998 | Huibers |
| 5,838,484 A | 11/1998 | Goossen et al. |
| 5,842,088 A | 11/1998 | Thompson |
| 5,905,482 A | 5/1999 | Hughes et al. |
| 5,912,758 A | 6/1999 | Knipe et al. |
| 5,943,158 A | 8/1999 | Ford et al. |
| 5,959,763 A | 9/1999 | Bozler et al. |
| 5,986,796 A | 11/1999 | Miles |
| 5,994,174 A | 11/1999 | Carey et al. |
| 6,028,690 A | 2/2000 | Carter et al. |
| 6,038,056 A | 3/2000 | Florence et al. |
| 6,040,937 A | 3/2000 | Miles |
| 6,046,840 A | 4/2000 | Huibers |
| 6,049,317 A | 4/2000 | Thompson et al. |
| 6,055,090 A | 4/2000 | Miles |
| 6,056,406 A | 5/2000 | Park et al. |
| 6,061,075 A | 5/2000 | Nelson et al. |
| 6,097,145 A | 8/2000 | Kastalsky et al. |
| 6,099,132 A | 8/2000 | Kaeriyama |
| 6,100,872 A | 8/2000 | Aratani et al. |
| 6,113,239 A | 9/2000 | Sampsell et al. |
| 6,147,790 A | 11/2000 | Meier et al. |
| 6,158,156 A | 12/2000 | Patrick |
| 6,160,833 A | 12/2000 | Floyd et al. |
| 6,171,945 B1 | 1/2001 | Mandal et al. |
| 6,172,797 B1 | 1/2001 | Huibers |
| 6,180,428 B1 | 1/2001 | Peeters et al. |
| 6,195,196 B1 | 2/2001 | Kimura et al. |
| 6,201,633 B1 | 3/2001 | Peeters et al. |
| 6,215,221 B1 | 4/2001 | Cabuz et al. |
| 6,232,936 B1 | 5/2001 | Gove et al. |
| 6,239,777 B1 | 5/2001 | Sugahara et al. |
| 6,243,149 B1 | 6/2001 | Swanson et al. |
| 6,282,010 B1 | 8/2001 | Sulzbach et al. |
| 6,288,472 B1 | 9/2001 | Cabuz et al. |
| 6,288,824 B1 | 9/2001 | Kastalsky |
| 6,295,154 B1 | 9/2001 | Laor et al. |
| 6,323,982 B1 | 11/2001 | Hornbeck |
| 6,327,071 B1 | 12/2001 | Kimura |
| 6,331,909 B1 | 12/2001 | Dunfield |
| 6,335,831 B2 | 1/2002 | Kowarz et al. |
| 6,356,254 B1 | 3/2002 | Kimura |
| 6,358,021 B1 | 3/2002 | Cabuz |
| 6,376,787 B1 | 4/2002 | Martin et al. |
| 6,407,851 B1 | 6/2002 | Islam et al. |
| 6,417,868 B1 | 7/2002 | Bock et al. |
| 6,433,917 B1 | 8/2002 | Mei et al. |
| 6,438,282 B1 | 8/2002 | Takeda et al. |
| 6,447,126 B1 | 9/2002 | Hornbeck |
| 6,449,084 B1 | 9/2002 | Guo |
| 6,456,420 B1 | 9/2002 | Goodwin-Johansson |
| 6,465,355 B1 | 10/2002 | Horsley |
| 6,466,190 B1 | 10/2002 | Evoy |
| 6,466,354 B1 | 10/2002 | Gudeman |
| 6,466,358 B2 | 10/2002 | Tew |
| 6,473,072 B1 | 10/2002 | Comiskey et al. |
| 6,473,274 B1 | 10/2002 | Maimone et al. |
| 6,480,177 B2 | 11/2002 | Doherty et al. |
| 6,496,122 B2 | 12/2002 | Sampsell |
| 6,538,748 B1 * | 3/2003 | Tucker et al. ............... 356/519 |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,574,033 B1 | 6/2003 | Chui et al. |
| 6,589,625 B1 | 7/2003 | Kothari et al. |
| 6,600,201 B2 | 7/2003 | Hartwell et al. |
| 6,606,175 B1 | 8/2003 | Sampsell et al. |
| 6,608,268 B1 | 8/2003 | Goldsmith |
| 6,624,944 B1 | 9/2003 | Wallace et al. |
| 6,625,047 B2 | 9/2003 | Coleman, Jr. |
| 6,630,786 B2 | 10/2003 | Cummings et al. |
| 6,632,698 B2 | 10/2003 | Ives |
| 6,635,919 B1 | 10/2003 | Melendez et al. |
| 6,643,069 B2 | 11/2003 | Dewald |
| 6,650,455 B2 | 11/2003 | Miles |
| 6,657,832 B2 | 12/2003 | Williams et al. |
| 6,660,656 B2 | 12/2003 | Cheung et al. |
| 6,666,561 B1 | 12/2003 | Blakley |
| 6,674,033 B1 | 1/2004 | Wang |
| 6,674,090 B1 | 1/2004 | Chua et al. |
| 6,674,562 B1 | 1/2004 | Miles et al. |
| 6,680,792 B2 | 1/2004 | Miles |
| 6,710,908 B2 | 3/2004 | Miles et al. |
| 6,741,377 B2 | 5/2004 | Miles |
| 6,741,383 B2 | 5/2004 | Huibers et al. |
| 6,741,384 B1 | 5/2004 | Martin et al. |
| 6,741,503 B1 | 5/2004 | Farris et al. |
| 6,747,785 B2 | 6/2004 | Chen et al. |
| 6,747,800 B1 | 6/2004 | Lin |
| 6,775,174 B2 | 8/2004 | Huffman et al. |
| 6,778,155 B2 | 8/2004 | Doherty et al. |
| 6,794,119 B2 | 9/2004 | Miles |
| 6,809,788 B2 | 10/2004 | Yamada et al. |
| 6,811,267 B1 | 11/2004 | Allen et al. |
| 6,819,469 B1 | 11/2004 | Koba |
| 6,822,628 B2 | 11/2004 | Dunphy et al. |
| 6,822,798 B2 * | 11/2004 | Wu et al. .................... 359/290 |
| 6,829,132 B2 | 12/2004 | Martin et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 6,870,654 B2 | 3/2005 | Lin et al. |
| 6,882,458 B2 | 4/2005 | Lin et al. |
| 6,882,461 B1 | 4/2005 | Tsai et al. |
| 6,891,658 B2 | 5/2005 | Whitehead et al. |
| 6,912,022 B2 | 6/2005 | Lin et al. |
| 6,947,200 B2 | 9/2005 | Huibers |
| 6,952,303 B2 | 10/2005 | Lin et al. |
| 6,958,847 B2 | 10/2005 | Lin |
| 6,959,990 B2 | 11/2005 | Penn |
| 6,972,889 B2 * | 12/2005 | Goodwin-Johansson et al. ......................... 359/290 |
| 7,008,812 B1 | 3/2006 | Carley |
| 7,053,737 B2 | 5/2006 | Schwartz et al. |

| | | | | | |
|---|---|---|---|---|---|
| 7,075,700 B2 | 7/2006 | Muenter | 2004/0240032 A1 | 12/2004 | Miles |
| 2001/0003487 A1 | 6/2001 | Miles | 2004/0240138 A1 | 12/2004 | Martin et al. |
| 2001/0028503 A1 | 10/2001 | Flanders et al. | 2004/0245588 A1 | 12/2004 | Nikkel et al. |
| 2002/0014579 A1 | 2/2002 | Dunfield | 2004/0263944 A1 | 12/2004 | Miles et al. |
| 2002/0015215 A1 | 2/2002 | Miles | 2005/0001828 A1 | 1/2005 | Martin et al. |
| 2002/0021485 A1 | 2/2002 | Pilossof | 2005/0002082 A1 | 1/2005 | Miles |
| 2002/0024711 A1 | 2/2002 | Miles | 2005/0003667 A1 | 1/2005 | Lin et al. |
| 2002/0027636 A1 | 3/2002 | Yamada | 2005/0014374 A1 | 1/2005 | Partridge et al. |
| 2002/0054424 A1 | 5/2002 | Miles | 2005/0024557 A1 | 2/2005 | Lin |
| 2002/0075555 A1 | 6/2002 | Miles | 2005/0035699 A1 | 2/2005 | Tsai |
| 2002/0114558 A1 | 8/2002 | Nemirovsky | 2005/0036095 A1 | 2/2005 | Yeh et al. |
| 2002/0126364 A1 | 9/2002 | Miles | 2005/0036192 A1 | 2/2005 | Lin et al. |
| 2002/0139981 A1 | 10/2002 | Young | 2005/0038950 A1 | 2/2005 | Adelmann |
| 2002/0146200 A1 | 10/2002 | Kurdle et al. | 2005/0042117 A1 | 2/2005 | Lin |
| 2002/0149828 A1 | 10/2002 | Miles | 2005/0046922 A1 | 3/2005 | Lin et al. |
| 2002/0149850 A1 | 10/2002 | Heffner et al. | 2005/0046948 A1 | 3/2005 | Lin |
| 2002/0167072 A1 | 11/2002 | Andosca | 2005/0057442 A1 | 3/2005 | Way |
| 2002/0167730 A1 | 11/2002 | Needham et al. | 2005/0068583 A1 | 3/2005 | Gutkowski et al. |
| 2002/0186483 A1 | 12/2002 | Hagelin | 2005/0068605 A1 | 3/2005 | Tsai |
| 2003/0015936 A1 | 1/2003 | Yoon et al. | 2005/0068606 A1 | 3/2005 | Tsai |
| 2003/0016428 A1 | 1/2003 | Kato et al. | 2005/0069209 A1 | 3/2005 | Damera-Vankata et al. |
| 2003/0029705 A1 | 2/2003 | Qui et al. | 2005/0078348 A1 | 4/2005 | Lin |
| 2003/0043157 A1 | 3/2003 | Miles | 2005/0157364 A1 | 7/2005 | Lin |
| 2003/0053078 A1 | 3/2003 | Missey et al. | 2005/0168849 A1 | 8/2005 | Lin |
| 2003/0054925 A1 | 3/2003 | Burkhardt | 2005/0195462 A1 | 9/2005 | Lin |
| 2003/0069413 A1 | 4/2003 | Pai et al. | 2005/0195467 A1 | 9/2005 | Kothari et al. |
| 2003/0072070 A1 | 4/2003 | Miles | 2005/0202649 A1 | 9/2005 | Hung et al. |
| 2003/0156315 A1 | 8/2003 | Li et al. | 2005/0249966 A1 | 11/2005 | Tung et al. |
| 2003/0202264 A1 | 10/2003 | Weber et al. | 2006/0044654 A1 | 3/2006 | Vandorpe et al. |
| 2003/0202265 A1 | 10/2003 | Reboa et al. | 2006/0065940 A1 | 3/2006 | Kothari et al. |
| 2003/0202266 A1 | 10/2003 | Ring et al. | 2006/0066599 A1 | 3/2006 | Chui et al. |
| 2003/0210851 A1 | 11/2003 | Fu et al. | 2006/0066640 A1 | 3/2006 | Kothari et al. |
| 2004/0008396 A1 | 1/2004 | Stappaerts | 2006/0067643 A1 | 3/2006 | Kothari et al. |
| 2004/0008438 A1 | 1/2004 | Sato | 2006/0077152 A1 | 4/2006 | Chui et al. |
| 2004/0027671 A1 | 2/2004 | Wu et al. | 2006/0077155 A1 | 4/2006 | Chui et al. |
| 2004/0027701 A1 | 2/2004 | Ishikawa | 2006/0077507 A1 | 4/2006 | Chui et al. |
| 2004/0051929 A1 | 3/2004 | Sampsell et al. | 2006/0077508 A1 | 4/2006 | Chui et al. |
| 2004/0056742 A1 | 3/2004 | Dabbaj | 2006/0077515 A1 | 4/2006 | Cummings et al. |
| 2004/0058532 A1 | 3/2004 | Miles et al. | 2006/0077516 A1 | 4/2006 | Kothari |
| 2004/0075967 A1 | 4/2004 | Lynch et al. | 2006/0077527 A1 | 4/2006 | Kothari et al. |
| 2004/0080035 A1 | 4/2004 | Delapierre | 2006/0079048 A1 | 4/2006 | Sampsell |
| 2004/0080807 A1 | 4/2004 | Chen et al. | 2006/0139723 A9 | 6/2006 | Miles |
| 2004/0100594 A1 | 5/2004 | Huibers et al. | | | |
| 2004/0100680 A1 | 5/2004 | Huibers et al. | FOREIGN PATENT DOCUMENTS | | |
| 2004/0124483 A1 | 7/2004 | Partridge et al. | | | |
| 2004/0125281 A1 | 7/2004 | Lin et al. | DE | 10228946 A1 | 1/2004 |
| 2004/0125347 A1 | 7/2004 | Patel et al. | EP | 0310176 A2 | 4/1989 |
| 2004/0136045 A1 | 7/2004 | Tran | EP | 0 361 981 | 4/1990 |
| 2004/0140557 A1 | 7/2004 | Sun et al. | EP | 0 667 548 A1 | 8/1995 |
| 2004/0145049 A1 | 7/2004 | McKinnell et al. | EP | 0 788 005 | 8/1997 |
| 2004/0145811 A1 | 7/2004 | Lin et al. | EP | 1275997 | 1/2003 |
| 2004/0147056 A1 | 7/2004 | McKinnell et al. | EP | 1 435 336 | 7/2004 |
| 2004/0147198 A1 | 7/2004 | Lin et al. | EP | 1 473 691 A | 11/2004 |
| 2004/0148009 A1 | 7/2004 | Buzzard et al. | EP | 1473581 A2 | 11/2004 |
| 2004/0150939 A1 | 8/2004 | Huff | EP | 1484635 | 12/2004 |
| 2004/0160143 A1 | 8/2004 | Shreeve et al. | FR | 2 824 643 A | 11/2002 |
| 2004/0174583 A1 | 9/2004 | Chen et al. | JP | 62 082454 | 4/1987 |
| 2004/0175577 A1 | 9/2004 | Lin et al. | JP | 05275401 A1 | 10/1993 |
| 2004/0179281 A1 | 9/2004 | Reboa | JP | 9-127439 | 5/1997 |
| 2004/0179445 A1 | 9/2004 | Park et al. | JP | 11211999 | 8/1999 |
| 2004/0184766 A1 | 9/2004 | Kim et al. | JP | 11211999 A | 11/1999 |
| 2004/0201908 A1 | 10/2004 | Kaneko | JP | 2000306515 A | 11/2000 |
| 2004/0207897 A1 | 10/2004 | Lin | JP | 2002-062490 | 2/2002 |
| 2004/0209192 A1 | 10/2004 | Lin et al. | JP | 2002277771 A | 9/2002 |
| 2004/0209195 A1 | 10/2004 | Lin | JP | 2003195201 A | 11/2003 |
| 2004/0212026 A1 | 10/2004 | Van Brooklin et al. | JP | 2004157527 A | 6/2004 |
| 2004/0217378 A1 | 11/2004 | Martin et al. | JP | 2004235465 A | 8/2004 |
| 2004/0217919 A1 | 11/2004 | Pichi et al. | JP | 2004286825 A | 10/2004 |
| 2004/0218251 A1 | 11/2004 | Piehl et al. | WO | WO 95/30924 | 11/1995 |
| 2004/0218334 A1 | 11/2004 | Martin et al. | WO | WO 97/17628 | 5/1997 |
| 2004/0218341 A1 | 11/2004 | Martin et al. | WO | WO 99/52006 A2 | 10/1999 |
| 2004/0227493 A1 | 11/2004 | Van Brocklin et al. | WO | WO 99/52006 A3 | 10/1999 |
| 2004/0233503 A1 | 11/2004 | Kimura | WO | WO 02/079853 | 10/2002 |

| | | |
|---|---|---|
| WO | WO 03/007049 A1 | 1/2003 |
| WO | WO 03/14789 A2 | 2/2003 |
| WO | WO 03/054925 | 7/2003 |
| WO | WO 03/069404 | 8/2003 |
| WO | WO 03/069413 A1 | 8/2003 |
| WO | WO 03/073151 A1 | 9/2003 |
| WO | WO 03/085728 A1 | 10/2003 |
| WO | WO 04/006003 A1 | 1/2004 |
| WO | WO 04/026757 A2 | 4/2004 |
| WO | WO 05/006364 A1 | 1/2005 |
| WO | PCT/US2005/ 026448 | 11/2005 |
| WO | PCT/US2005/029820 | 12/2005 |
| WO | WO 2006/014929 | 2/2006 |

OTHER PUBLICATIONS

Fork, et al., "P-67: Chip on Glass Bonding using StressedMetal™ Technology" Sid 05 Digest, May 24, 2005.
Kim et al., "Control of Optical Transmission Through metals Perforated With Subwave-Length Hole Arrays," Optic Letters, vol. 24, No. 4, Feb. 15, 1999, pp. 256-257.
Lin et al., "Free-Space Michromachined Optical Switches for Optical Networking," IEEE Journal of Selected Topics in Quantum Electronics, vol. 5, No. 1m Jan./Feb. 1999, pp. 4-9.
Little et al., "Vertically Coupled Microring Resonator Channel Dropping Filter," IEEE Photonics Technology Letters, vol. 11, No. 2, 1999.
Magel, "Integrated Optic Devices Using Micromachined Metal Membranes," SPIE vol. 2686, 0-8194-2060-3/1996.
Science and Technology, The Economist, May 22, 1999, pp. 89-90.
Butler et al., "An Embedded Overlay Concept for Microsystems Packaging," IEEE Transactions on Advanced Packaging IEEE USA, vol. 23, No. 4, pp. 617-622, XP002379648 (2000).
Chunjun Wang et al., "Flexible curcuit-based RF MEMS Switches," MEMS. XP002379649 pp. 757-762, (Nov. 2001).
Joannopoulos et al., "Molding the Flow of Light," Photonic Crystals. 1995.
Nagami et al., "Plastic Cell Architecture: Towards Reconfigurable Computing for General-Purpose," Proc. IEEE Workshop on FPGA-based Custom Computing Machines, (1998).
Zhou et al., "Waveguide Panel Display Using Electromechanical Spatial Modulators," SID Digest, vol. XXIX, 1998.
International Search Report and Written Opinion of the International Searching Authority for PCT/US2005/005919 dated Aug. 24, 2005.
International Search Report Application No. PCT/US2005/030962, Dated Aug. 31, 2005.
International Search Report Application No. PCT/US2005/034465, Dated Sep. 23, 2005.
European Search Report Application No. 05255693.3—2217, dated, May 24, 2006.
European Search Report Application No. EP 05 25 5673 in 9 pages, dated Jan. 23, 2006.
Austrian Search Report No. 66/2005, Dated May 9, 2005.
Austrian SR, filed Jul. 14, 2005.
Austrian SR, filed Jul. 4, 2005.
Austrian SR, filed Jul. 15, 2005.
Austrian SR, filed Jul. 15, 2005.
Austrian SR, filed Jul. 29, 2005.
Austrian SR, filed Aug. 11, 2005.
ROC Pat Pub No. 157313, filed May 1, 1991, FSI International, Inc.
Akasaka. "Three-Dimensional IC Trends" Proc IEEE 1986, 74(12): 1703-1714.
Aratani et al. "Process and Design Considerations for Surface Micromachined Beams for a Tuneable Interferometer Array in Silicon" IEEE 1993 p. 230-235.
Aratani et al., "Surface micromacined tuneable interferometer array," Sensors and Actuators A, 1994, 43:17-23.
Bass et al. "Multiple Beam Interference," Handbook of Optics. 1995 McGraw Hill p. 2.29-2.36.

Conner et al., "P-36: Hybrid Color Display Using Optical Interference Filter Array" SID 93 Digest, 1993, p. 577-580.
Giles et al. "A Silicon MEMS Optical Switch Attenuator and Its Use in Lightwave Subsystems" IEEE J Sel Topics in Quantum Electronics Jan./Feb. 1999, 5(1):18-25.
Goossen et al. "Possible display applications of the silicon mechanical anti-reflection switch" SID 1994.
Goossen et al. "Silicon Modulator Based on Mechanically-Active Anti-Reflection Layer with 1 Mbit/sec Capability for Fiber-in-the-Loop Applications" IEEE Photonics Tech Letters Sep. 1994, 6(9): 1119-1121.
Goossen "MEMS-Based Variable Optical Interference Devices" IEEE Aug. 21, 2000.
Gosch "West Germany Grabs the Lead in X-Ray Lithography" Electronics Feb. 5, 1987, p. 78-80.
Howard et al., "Nanometer-Scale Fabrication Techniques" VLSI Electronics Microstructure Science vol. 5, 1982, p. 145-173.
Ibbotson et al. "Comparison of XeF2 and F-atom reactions with Si and SiO2" App Phys Lett, Jun. 1984 44(12) p. 1129-1131.
Jackson, Classical Electrodynamics p. 568-573.
Jerman et al. "A Miniature Fabry-Perot Interferometer Fabricated Using Silicon Micromachining Techniques" IEEE Electron Devices Society 1988.
Jerman et al. "A Miniature Fabry-Perot Interferometer with a Corrugated Silicon Diaphragm Support" IEEE Jun. 24, 1991 p. 140-144.
Johnson, Microwave Scanning Antennas, vol. 1: Apertures, 1964 p. 251-261.
"Light Over Matter", Circle 36, Jun. 1993.
Miles "A New Reflective FPD Technology Using Interferometric Modulation" May 11-16, 1997.
Newsbreaks, "Quantum-trench devices might operate in terahertz frequencies" Laser Focus World, May 1993, p. 13.
Oliner et al. "Radiating Elements and Mutual Coupling" Microwave Scanning Antennas, vol. II: Array Theory and Practice 1966 p. 131-194 1966.
Peerlings et al. "Long Resonator Micromachined Tunable GaAs-AlAs Fabry-Pérot Filter" IEEE Photonics Tech Letters Sep. 1997, 9(9):1235-1237.
Raley et al. "A Fabry-Perot microinterferometer for visible wavelengths" IEEE 170-173 Jun. 1992.
Schnakenberg et al. "TMAHW Etchants for Silicon Micromachining" Proc. Transducers 91, 1991, p. 815-818.
Sperger et al. "High performance patterned all-dielectric interference colour filters for display applications" SID Digest 1994, p. 81-83.
Stone, Radiation and Optics: An Introduction to Classical Theory 1963, p. 340-343.
Walker et al. "Electron-beam-tunable interference filter spatial light modulator" Optics Letters May 1988, 13(5): 345-347.
Williams et al. "Etch Rates for Micromachining Processing" Microelectromechanical Systems, Dec. 1996, 5(4): 256-269.
Winters et al. The etching of silicon with XeF2 vapor. Appl. Phys Lett, Jan. 1979, 34(1): 70-73.
Winton, "A novel way to capture solar energy" Chemical Week May 15, 1985, p. 17-18 May 1, 1985.
Wu et al. "Design of a Reflective Color LCD Using Optical Interference Reflectors" Asia Display, Oct. 1995.
Wu et al. MEMS Designed for Tunable Capacitors, IEEE MTT-S Digest, 1998, p. 127-129.
U.S. Appl. No. 11/045,800, filed Jan. 28, 2005, Miles et al.
Chiou et al., "A Novel Capacitance Control Design of Tunable Capacitor Using Multiple Electrostatic Driving Electrodes", Proceedings of the 2001 1st Conference on Nanotechnology, pp. 319-324, (Oct. 28-30, 2001).
ISR and WO PCT/US05/029822 filed Aug. 22, 2005.

* cited by examiner

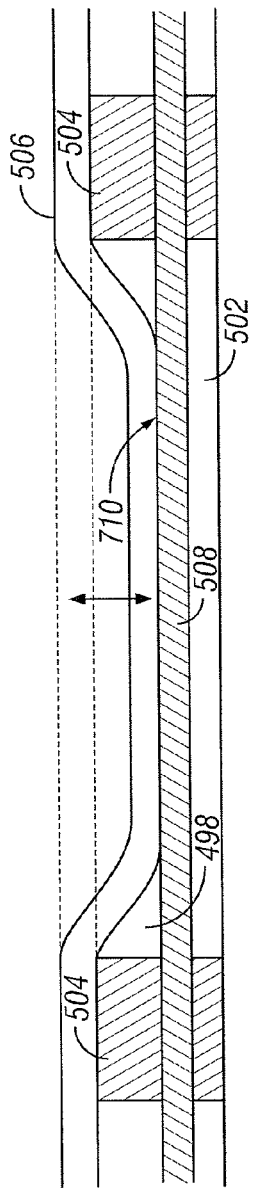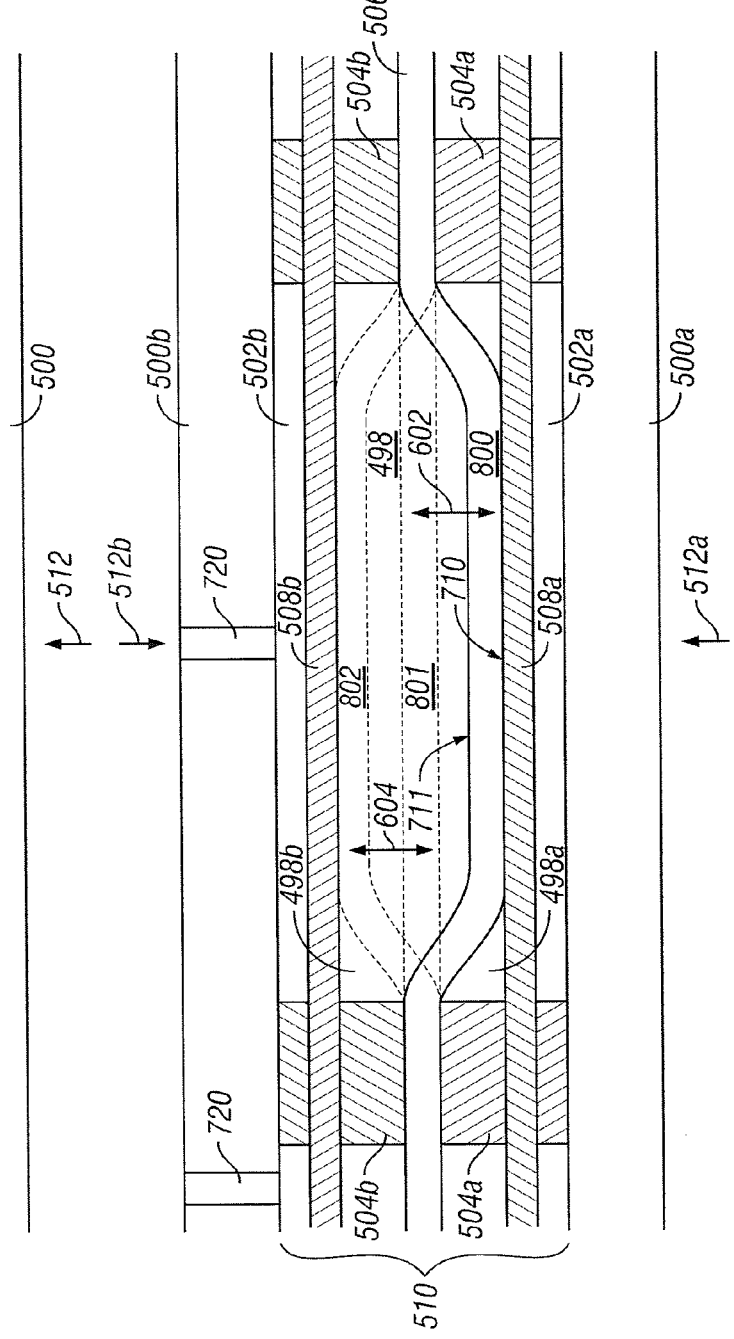

REFLECTIVE DISPLAY DEVICE HAVING VIEWABLE DISPLAY ON BOTH SIDES

RELATED APPLICATIONS

This application claims priority to U.S. provisional application 60/613,323, filed Sep. 27, 2004, incorporated by reference in its entirety.

DESCRIPTION OF THE RELATED TECHNOLOGY

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The systems, methods, and devices of the invention each have several aspects, no single one of which is solely responsible for its desirable attributes. Without limiting the scope of this invention, its more prominent features will now be discussed briefly.

In some aspects an interferometric modulator having two viewing surfaces is provided. Each viewing surface or viewable surface can generate an image to be viewed. The first viewing surface is on the front of the interferometric modulator. The second viewing surface is on the opposite side of the interferometric modulator. In some embodiments, the interferometric modulator includes first, second, and third electrodes deposited on a glass substrate. The first and third electrodes can be positioned proximate to the first and second viewing surface respectively. The second electrode can move toward the first or third electrode. A viewer can view an image generated by the interferometric modulator either through the first electrode or the third electrode. In other embodiments, the interferometric includes first, second, third, and fourth electrodes on a glass substrate. The first and fourth electrodes can be positioned proximate to a first and second viewing surface respectively. The second electrode can move towards the first electrode and the third electrode can move towards the fourth electrode. The viewer can view the modulator through either the first or fourth electrode. A support stack can connect the two substrates and supports the second or second and third electrodes.

In some aspects a light modulating device is provided. The device includes a first substrate substantially transparent to light and a second substrate substantially transparent to light. The second substrate is substantially parallel to the first substrate and spaced from the first substrate. The device further includes at least one support stack coupling the first substrate and the second substrate together. There is a first partially reflective layer coupled to the first substrate and a second partially reflective layer coupled to the second substrate. The second partially reflective layer is substantially parallel to the first partially reflective layer and spaced from the first partially reflective layer. The first partially reflective layer and the second partially reflective layer define a cavity therebetween. There is at least one movable layer supported by the at least one support stack. The at least one movable layer is movable within the cavity along a direction generally perpendicular to the first and second partially reflective layers. There is a first reflective surface and a second reflective surface coupled to the at least one movable layer to move within the cavity with the at least one movable layer. The first reflective surface and the first partially reflective layer define a first sub-cavity therebetween and the second reflective surface and the second partially reflective layer define a second sub-cavity therebetween. In some embodiments, the at least one movable layer includes a single movable layer. In some embodiments, the support stack includes a first support portion between the single moveable layer and the first partially reflective layer and a second support portion between the single moveable layer and the second partially reflective layer. In some embodiments, upon movement of the single movable layer towards the first partially reflective layer, the first sub-cavity decreases in size and the second sub-cavity increases in size. In some embodiments, the first reflective surface includes a first surface of the single movable layer and the second reflective surface includes a second surface of the single movable layer. In some embodiments, the single movable layer includes at least one reflective portion, the first reflective surface includes a first surface of the at least one reflective portion and the second reflective surface includes a second surface of the at least one reflective portion. In some embodiments, at least one of the first substrate and the second substrate includes holes sufficiently large to allow an etchant gas to a volume between the first and second substrates. In some embodiments, the at least one movable layer includes a first movable layer and a second moveable layer. The first and second movable layers can be positioned between the two partially reflective layers. In some embodiments, the first and second moveable layers do not contact one another when they move. In some embodiments, the at least one support stack includes a first support portion between the first moveable layer and the first partially reflective layer, a second support portion between the first moveable layer and the second movable layer, and a third support portion between the second moveable layer and the second partially reflective layer. In some embodiments, the first movable layer includes the first reflective surface and the second movable layer includes the second reflective surface. In some embodiments, upon movement of the first movable layer towards the first partially reflective layer, the first sub-cavity decreases in size and the second sub-cavity does not change in size, and wherein, upon movement of the second movable layer towards the second partially reflective layer, the second sub-cavity decreases in size and the first sub-cavity does not change in size. In some embodiments, the first reflective surface includes a surface of the first movable layer and the second reflective surface includes a surface of the second movable layer. In some embodiments, the first movable layer includes a first reflective portion. The first reflective surface includes a surface of the first reflective portion, the second movable layer includes a second reflective portion. The second reflective surface includes a surface of the second reflective portion. In some embodiments, a distance between the first reflective surface and the second reflective surface when the first movable layer and the second movable layer are unactuated is between about two and about 10 times a height of the first support portion.

In some embodiments, the light modulating device is a display system comprising a first electronic display and a second electronic display comprising said light modulating device, a processor that is in electrical communication with said display, said processor being configured to process image data, and a memory device in electrical communication with said processor. In some embodiments, the display system further includes a first controller configured to send at least one signal to the display, and a second controller configured to send at least a portion of the image data to said first controller. In some embodiments, the display system further includes an image source module configured to send the image data to the processor. In some embodiments, the image source module includes at least one of a receiver, transceiver, and transmitter. In some embodiments, the display system further includes an input device configured to receive input data and to communicate said input data to said processor.

In some aspects, a light modulating device is provided. The device includes a first substrate and a second substrate spaced from the first substrate, a first means for partially reflecting light positioned on said first substrate, a second means for partially reflecting light positioned on the second substrate, a means for reflecting light positioned and movable between said first means for partially reflecting light and said second means for partially reflecting light, and a means for coupling the first substrate and the second substrate together, wherein said means for coupling the first substrate and the second substrate further supports said means for reflecting light.

In some aspects, a light modulating device is created by the steps comprising providing a first substrate, forming a first partially reflective layer, forming a support stack, forming a reflective layer, wherein the reflective layer is supported by the support stack, forming a second partially reflective layer, wherein the second partially reflective layer is coupled to the first partially reflective layer by the support stack, and applying a second substrate to the second partially reflective layer. In some embodiments, the further step of forming a second reflective layer is added. The second reflective layer is positioned between the first and second partially reflective layers and is further supported by said support stack.

In some aspects, a method of creating two oppositely facing images is provided. The method includes providing a first partially reflective layer on a first transparent substrate and providing a second partially reflective layer on a second transparent substrate that is spaced from the first transparent substrate. The method further includes providing a single movable layer supported on a support stack, the support stack connecting the first partially reflective layer and the second partially reflective layer and positioning the single movable layer between the first and second partially reflective layers. The method further includes moving the moveable layer in a direction generally perpendicular to the first and second partially reflective layers, thereby creating a first image viewable through the first transparent substrate and moving the moveable layer in direction generally perpendicular to the first and second partially reflective layers, thereby creating a second image viewable through the second transparent substrate.

In some aspects, a method of manufacturing an interferometric modulator device with two viewable sides is provided. The methods of manufacturing includes providing a first substrate, forming a first partially reflective layer, forming a first support portion, forming a reflective layer, wherein the first support portion supports the reflective layer, forming a moveable layer, forming a second support portion, forming a second partially reflective layer, wherein the first and second partially reflective layers are coupled through the support portions, and applying a second substrate to the second partially reflective layer. In some embodiments, the method further includes providing a sacrificial layer and etching said sacrificial layer away to create cavities. In some embodiments, the method further includes adding holes to the partially reflective layers and the second substrate and using said holes to administer an etchant to the sacrificial layer. In some embodiments, the method further includes forming a third support portion, forming a second moveable layer, and forming a second reflective layer. In some embodiments, a light modulating device created according to any of the above methods is provided. In some embodiments, the light modulating device is created by the further step of forming a second movable layer, wherein said second movable layer is positioned between the first and second partially reflective layers and is further supported by said support stack.

In some aspects, a light modulating device is provided. The device comprises a first substrate with two sides. On a first side of the substrate is a first electrode layer that is covered by a dielectric layer. On top of this is a first support portion, supporting a moveable layer that comprises a reflective surface. On top of this is a second support portion that supports an optional second dielectric layer and a first partially reflective layer. On top of this is an optional second substrate that is substantially transparent. On the second side of the first substrate is a second electrode layer that is covered by a third dielectric layer. On top of this is a third support portion that supports a second moveable layer that comprises a second reflective surface. On top of this is a fourth support portion that supports an optional fourth dielectric layer and a second partially reflective layer. On top of this is an optional third substrate that is substantially transparent. In some embodiments, the first substrate is not transparent to light. In some embodiments, the height of the second and fourth support portions is less than the height of the first and third support portions. In some embodiments, the height of the second and fourth support portions is minimized so that it is just enough to allow free movement of the moveable layers. In some embodiments, there are no optional substrates. In some embodiments, there are no optional dielectric layers. In some aspects, a method of generating two images at once using the above light modulating device is provided.

BRIEF DESCRIPTION OF THE DRAWINGS

These and other aspects of the invention will be readily apparent from the following description and from the appended drawings (not to scale), which are meant to illustrate and not to limit the invention, and wherein:

FIG. 8 schematically illustrates a cross section of one embodiment of an interferometric modulator that has a single viewing surface.

FIG. 9 is a cross sectional view of an embodiment that provides a viewing surface to both major surfaces of a modulator array.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

In one aspect, the present device is an interferometric modulator display that can generate two images, each on a separate viewing surface. Each image or viewing surface is on an opposite side of a plane. In one embodiment, this is achieved by using a single moveable layer with two reflective surfaces. The moveable layer is suspended between two partially reflective surfaces through the use of a support stack. One of the reflective surfaces can be moved towards the first partially reflective surface and the other reflective surface can be moved in the opposite direction towards the second partially reflective surface. This allows an image to be generated on the first viewing surface and on the second viewing surface of the device. In another embodiment, two moveable layers are used. Each moveable layer has a reflective layer facing a different partially reflective layer. Each layer is supported and separated by the support stack. Movement between each of the moveable layers and the partially reflective layers allows an image to be generated on two surfaces of the device. Some embodiments allow for both images to be generated and viewed simultaneously, each image on a separate viewing surface. In some embodiments, the images generated can be can completely independent of one another. In other embodiments, while two images can be generated, one on each viewing surface, the images are related in their patterns as a single moveable layer generates both images.

Figure 1:
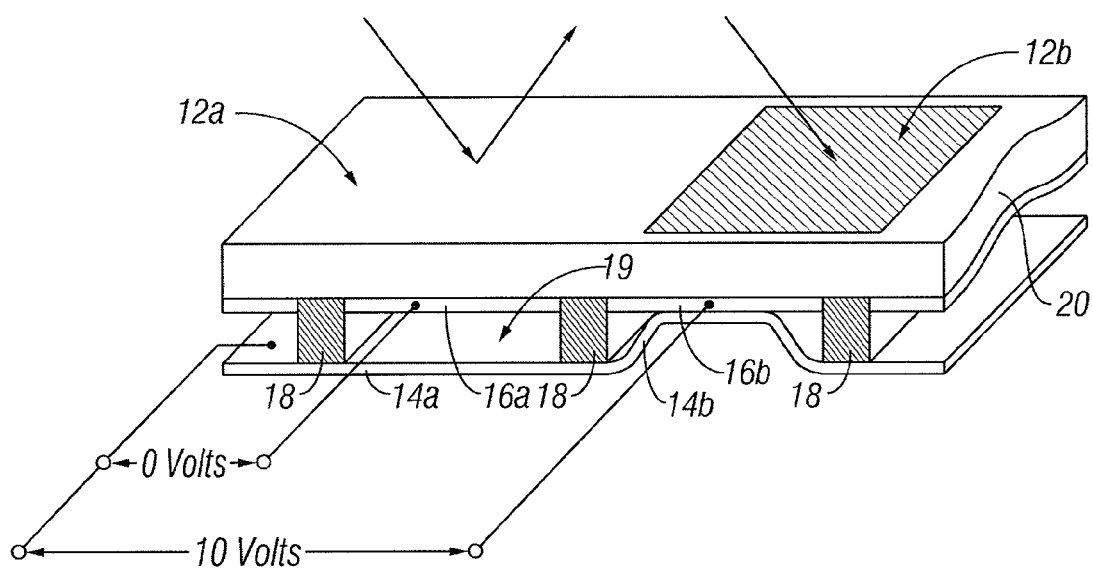
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
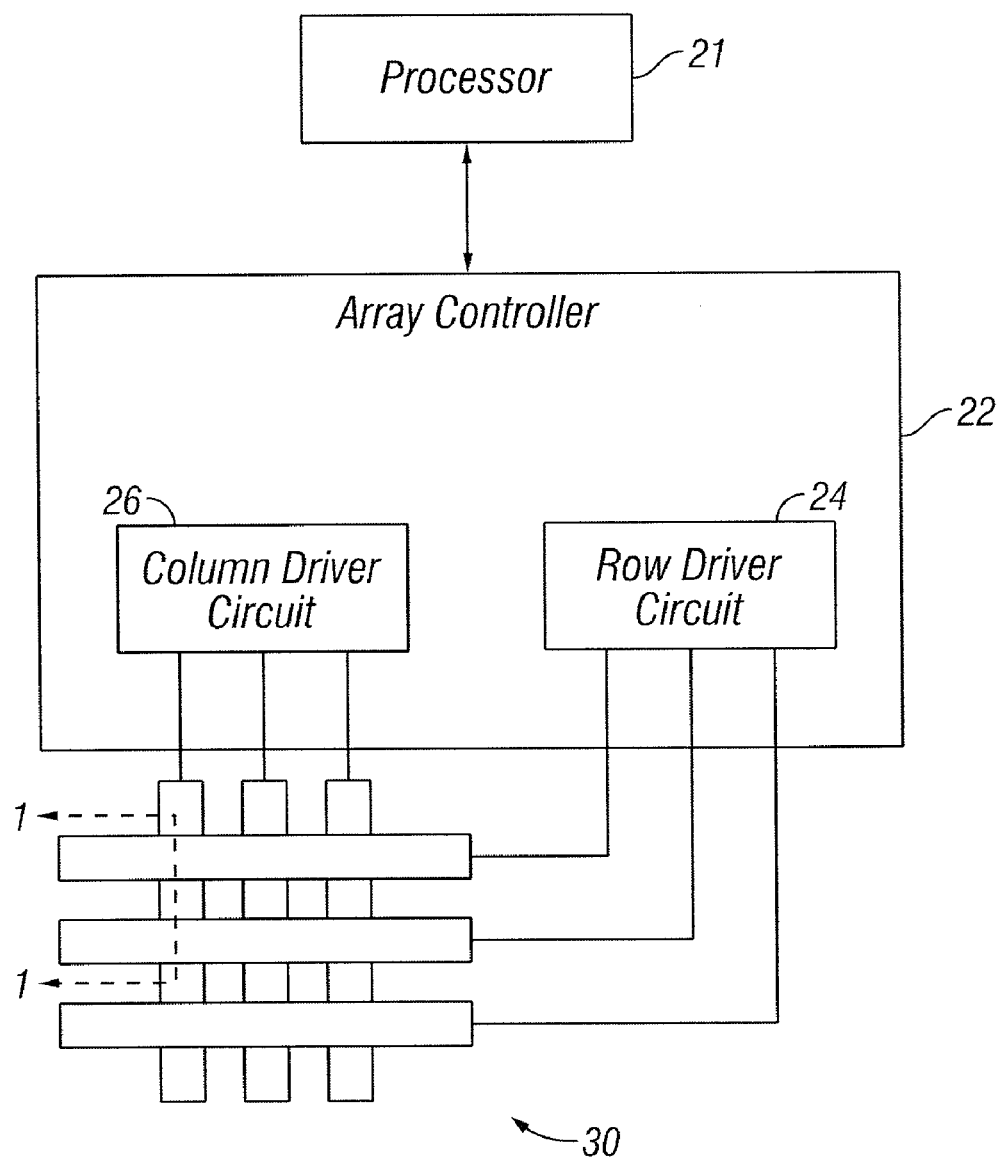
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium II®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
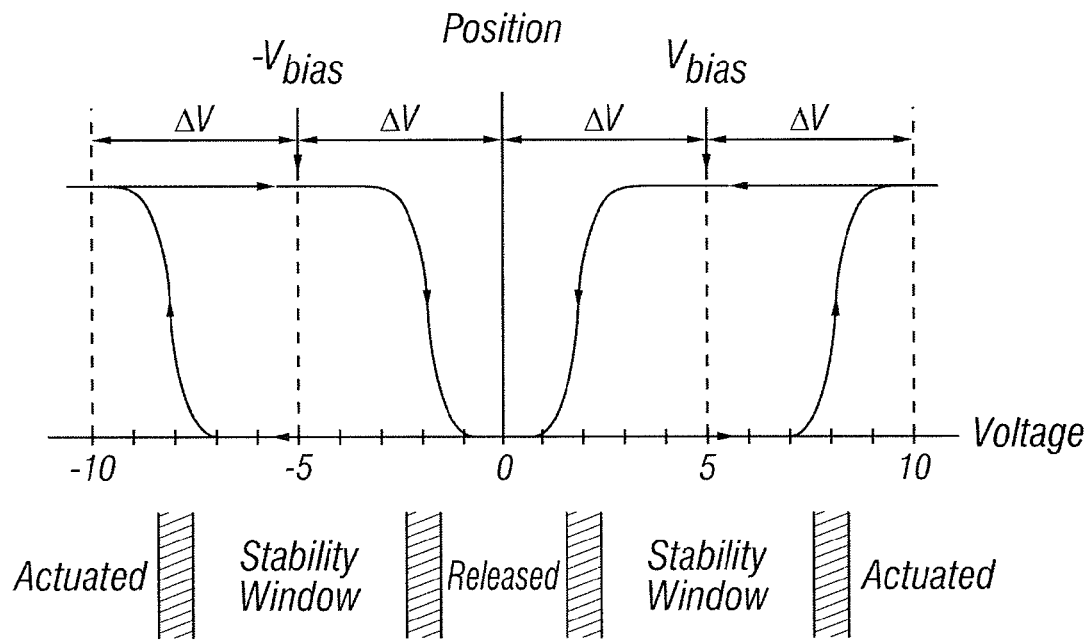
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3≧3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, arid the appropriate row to $+\Delta V$, which may correspond to −5 volts and +5 volts respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
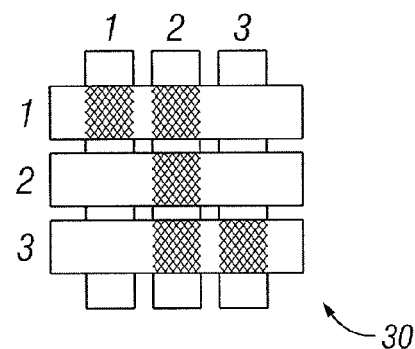
FIGS. 5A and 5B illustrate one exemplary timing diagram for row and column signals that may be used to write a frame of display data to the 3×3 interferometric modulator display of FIG. 2.
Figure 5B:
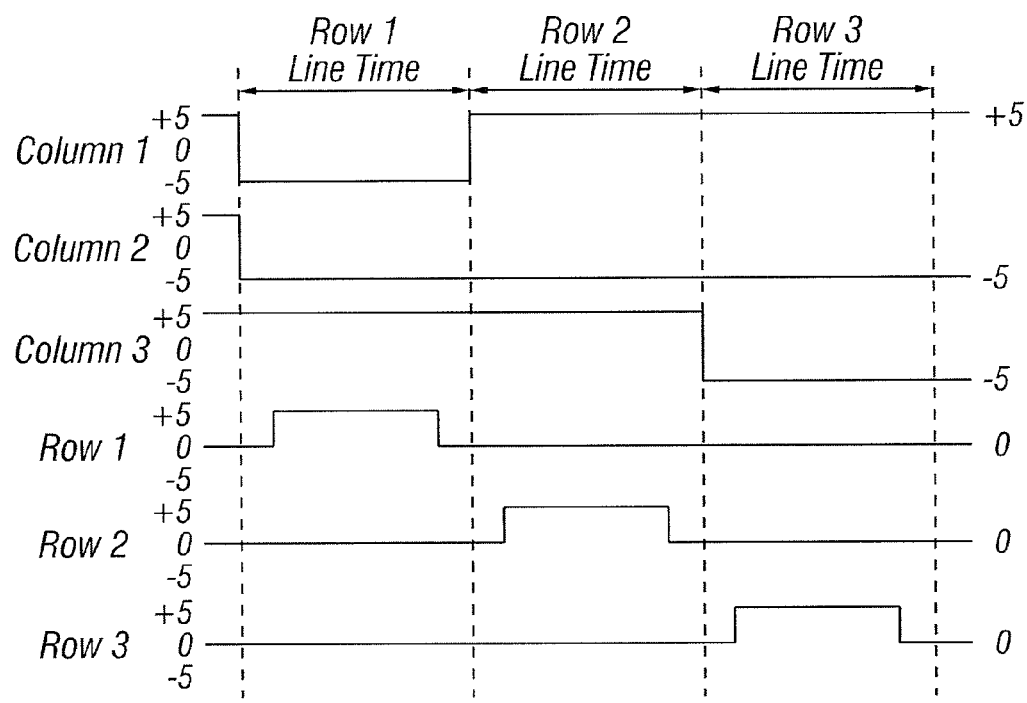

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
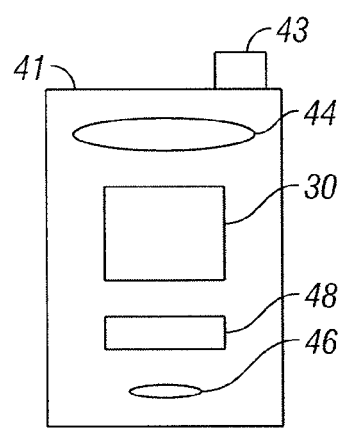
FIGS. 6A and 6B are system block diagrams illustrating an embodiment of a visual display device comprising a plurality of interferometric modulators.
Figure 6B:
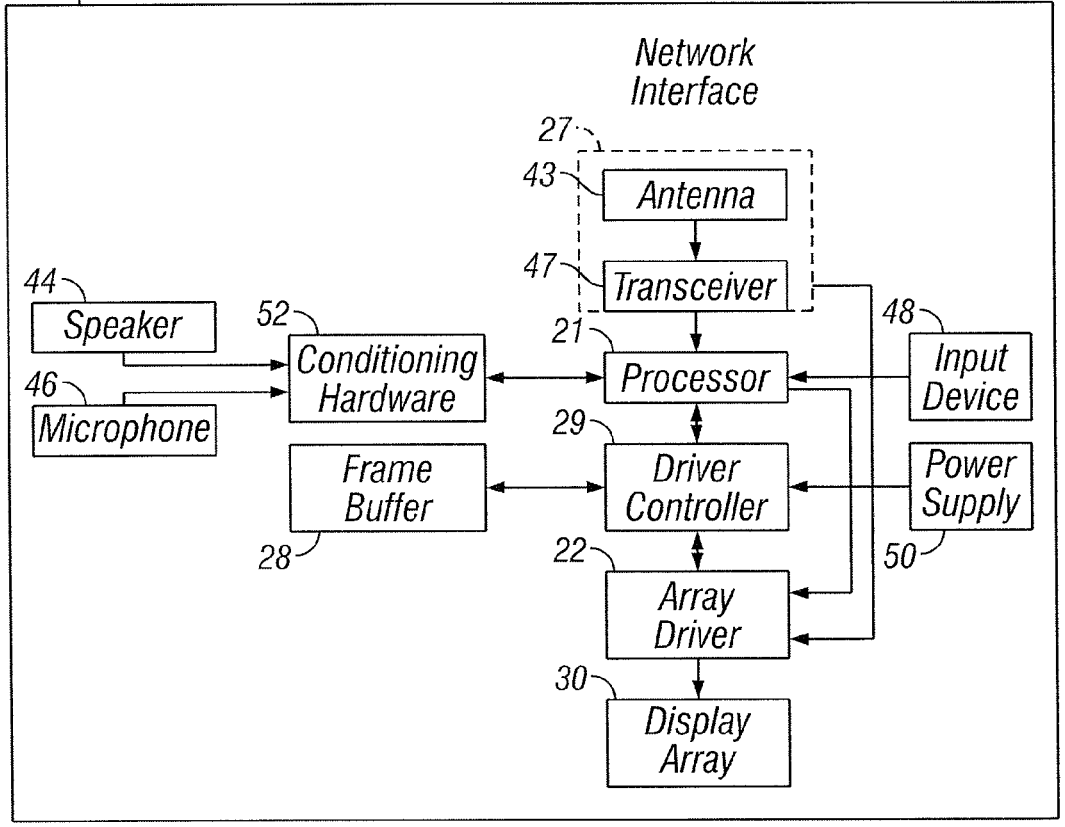

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
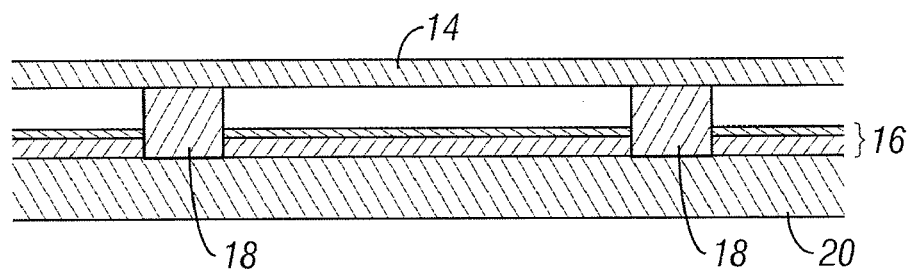
FIG. 7A is a cross section of the device of FIG. 1.
Figure 7B:
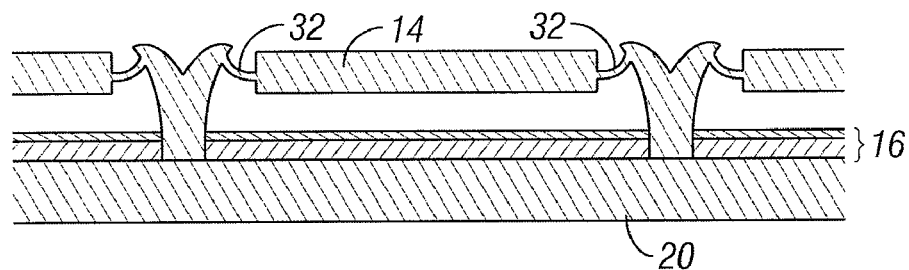
FIG. 7B is a cross section of an alternative embodiment of an interferometric modulator.
Figure 7C:
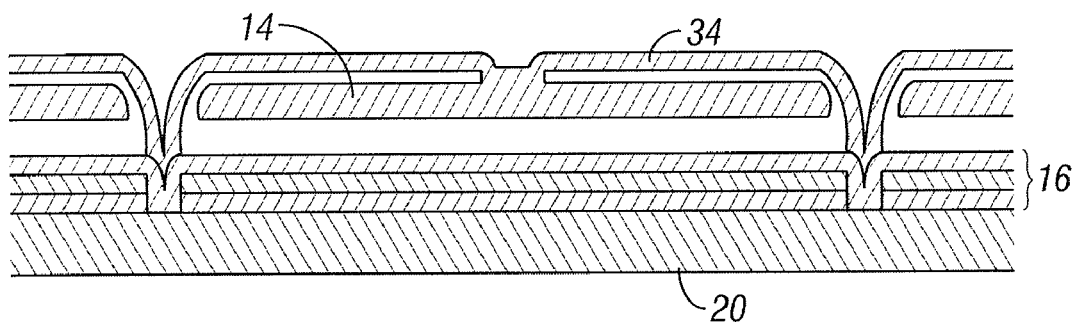
FIG. 7C is a cross section of another alternative embodiment of an interferometric modulator.
Figure 7D:
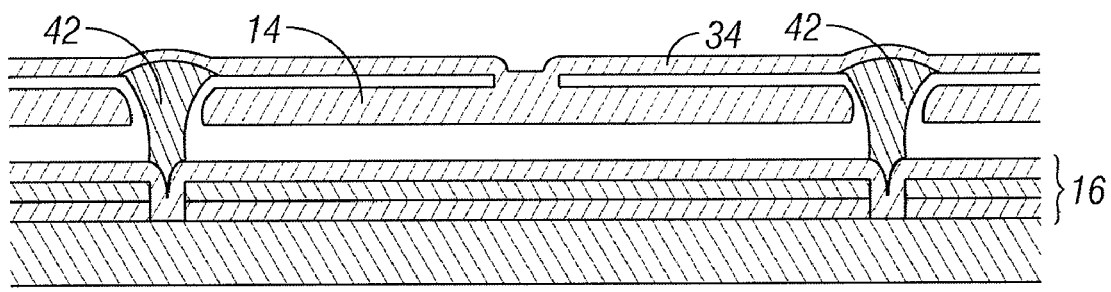
FIG. 7D is a cross section of yet another alternative embodiment of an interferometric modulator.
Figure 7E:
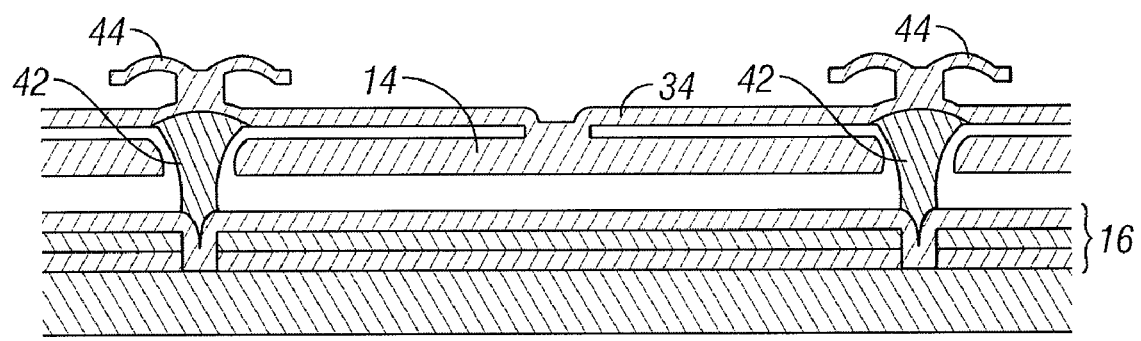
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As described above, interferometric modulators modulate light by controlling the self-interference of light that strikes a surface of the modulator. For example, U.S. Pat. No. 5,835,255 discloses the interferometric modulator shown in FIG. 1 (see FIG. 20B in U.S. Pat. No. 5,835,255). The entire content of U.S. Pat. No. 5,835,255 is hereby incorporated by reference in its entirety.

As shown in FIG. 8, interferometric modulators can also include an insulating dielectric layer 508 between the opposing surfaces of the interferometric cavity. When the interferometric modulator is driven, the insulating layer 508 prevents direct contact between the layers 502 and 506, thus preventing a short circuit.

As shown in FIG. 8, in a traditional interferometric modulator, there is a single viewing surface on the glass substrate 500. That is, the cavities can be viewed by a user of the device by looking through the substrate 500 in the direction of arrow 512. Depending on the actuation state and dimensions of the cavities, each cavity can appear white, black, or a particular color to a viewer. An array of individually controllable cavities can thus form a reflective display device for a variety of applications, including cell phones, PDAs, and laptop computers.

A. Interferometric Modulators with Two Viewing Surfaces

In some applications, it is useful to have a display device that includes a viewable display area on both sides of the device. It can be particularly advantageous to have, for example, a panel display that is capable of generating images on both sides, while maintaining a thin profile. While dual sided displays can be generated by simply placing two display devices back to back, this can result in a relatively thick or cumbersome device. Thus, devices that can generate two images, while maintaining a thin or minimal profile can be useful. These devices can be achieved in a variety of ways.

One example of such a device is shown in FIG. 9. The device comprises two substrates 500a and 500b, that can be held together by a support stack 510. The lower section of the device in FIG. 9 is similar to the device shown in FIG. 8. As above, the embodiment in FIG. 9 contains a first substrate 500a that is substantially transparent to light. On top of the first substrate is a first partially reflective layer (also known as a partially transmissive layer) 502a. The partially reflective layer 502a is selectively reflective to light. On top of this layer 502a is a dielectric layer 508a (or protective coating). On top of and passing through these layers is a support stack 510. The support stack 510 connects the first substrate 500a, the second substrate 500b. In some embodiments, the support stack is directly connected to the substrate. In other embodiments, the support stack is connected to the dielectric layer or another layer and thereby allowing for a mechanical bond to the substrate. The support stack is made up of various support portions 504a and 504b, referred to as posts above. The support portions can vary in size and shape. The support stack 510 further connects the first dielectric layer 508a and the second dielectric layer 508b. Additional support portions can connect the first substrate and the second substrate, for example, between the dielectric layers 508a and 508b and the substrates 500a and 500b.

Supported by the support stack 510 is a movable layer 506. The moveable layer 506, as above, can flex to allow a change in size of the chamber 498a. The movement of the moveable layer is in direction 602 when the device is to be viewed from direction 512a. The movement of the moveable layer is in direction 604 when the device is to be viewed from Image Page 2 direction 512b. This movement is generally perpendicular to the plane of the layer. On both sides of the movable layer are reflective surfaces 710 and 711.

In the depicted embodiment, the reflective surfaces 710 and 711 and the surfaces of the moveable layer 506 in cavity 498 are one in the same; however, they need not be a single structure. For example, the reflective surfaces 710 or 711 can be part of a reflective portion that is then connected to the moveable layer 506. The reflective portion can simply be a part of the moveable layer 506, where the reflective surface 710 or 711 are. Alternatively, the reflective portion can refer to a part that is dedicated for the reflective surface, indicating that a separate part primarily functions for the movement of the layer. For example, possible reflective portions are shown in FIGS. 7B-7E, item 14, where the moveable, and more particularly the deformable layer is item 32 or 34, while the reflective surface is on the bottom of item 14. In general, the term moveable layer can be used to describe all of the parts that move when the device transitions from an open to a closed position. "Deformable layer" is used to describe those layers, or parts of layers, that lack other characteristics (such as reflective properties) but that can still move. Additionally, as will be appreciated by one of skill in the art, the moveable layer will also comprise a second electrode.

The movable layer 506 is contained within a cavity 498. The cavity can be defined by the first partially reflective layer 502a and the second partially reflective layer 502b. Both layers can have a dielectric layer 508a and 508b associated therewith, as well as other layers or devices. The cavity 498 is divided into subcavities 498a and 498b, which change in size depending on the position of the movable layer 506 in the main cavity 498. When the movable layer 506 is deflected to the first partially reflective layer 502a, the size of the cavity 498a is reduced. When the movable layer 506 is deflected to the second partially reflective layer 502b, the size of the cavity 498b is reduced. In general, the moveable layer 506 spends most of its stationary time in one of three positions 800, 801, and 802, and can move between the three positions depending upon the charge between the electrodes associated with the partially reflective layers 502a, 502b, and the electrodes associated with the moveable layer 506, as well as the mechanical properties of the moveable layer 506.

The support stack further connects the first dielectric layer 508a to a second dielectric layer 508b. The second dielectric layer 508b is associated with a second partially reflective layer 502b which is also partially or selectively transparent to light. Again, while the second partially reflective layer can serve as the third electrode, in some embodiments there is a separate electrode connected to the second partially reflective layer as the second partially reflective layer may not have the desired electrical properties. Above the second partially reflective layer 502b is a second substrate 500b. In some embodiments, in the first, second, or both substrates 500b, 500a are holes 720. As explained in more detail below, the holes 720 need only be large enough and frequent enough to allow an etchant to enter the area that is to be the cavity 498, although this is not required in all embodiments, as discussed below.

Figure 10:
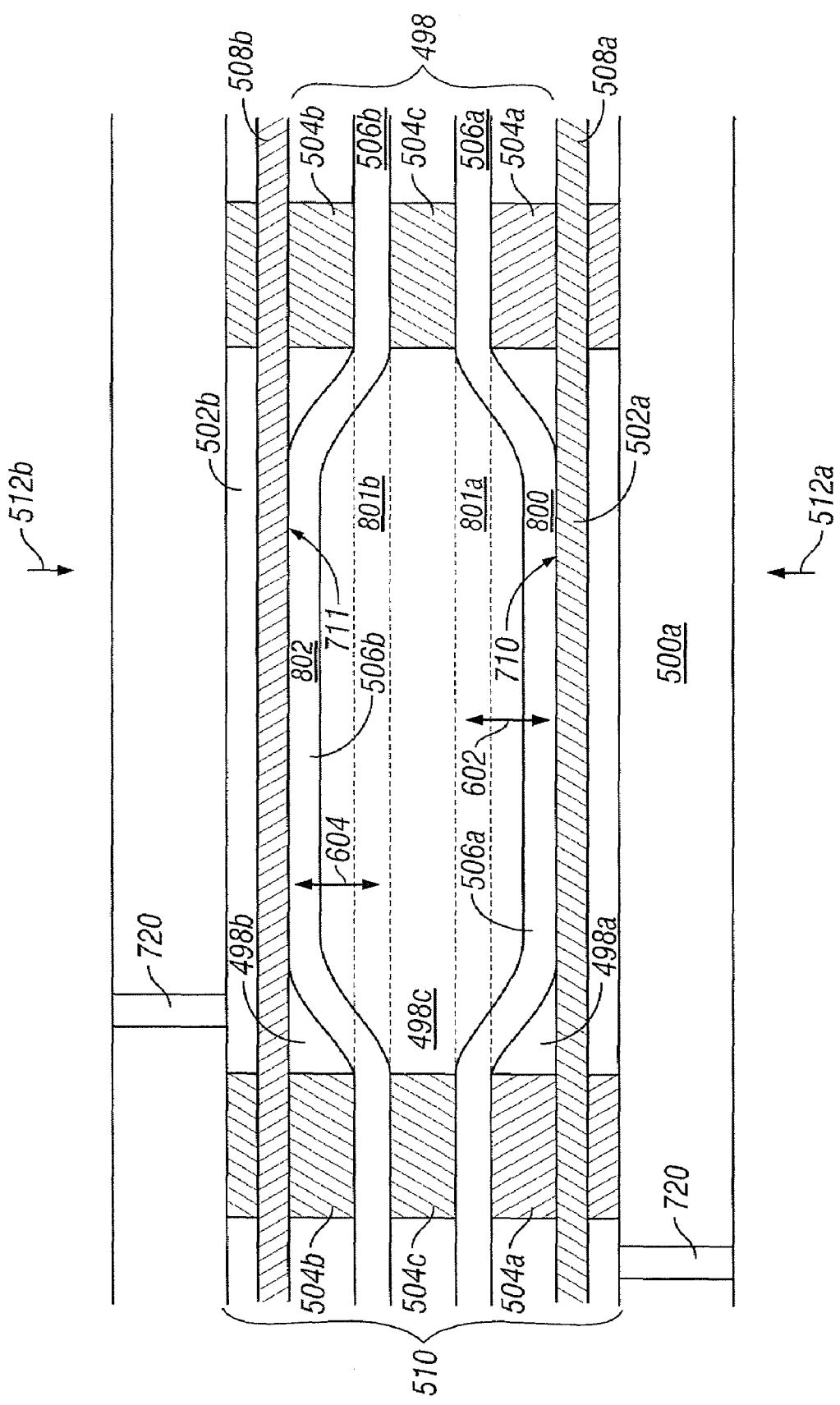
FIG. 10 is a cross section view of another embodiment that provides a viewing surface to both major surfaces of a modulator array.

An alternative embodiment is depicted in FIG. 10. In this embodiment, two movable layers 506a and 506b are used to achieve two images, one image on each side of the surface of the plane. In this embodiment, two images can be produced simultaneously, one on each side of the display surface.

In this embodiment, there are, again, two substrates 500a and 500b that are supported by a support stack 510. Again, the support stack 510 comprises support portions 504a, and 504b. There is also at least an additional support portion 504c, as well as other possible support portions to fully connect the substrates 500a and 500b together. The height of the support portion 504c can be sufficient so as to avoid unnecessary or detrimental contact between the movable portions 506a and 506b.

Similar to the above embodiment, the first substrate 500a is substantially transparent to light and is covered with a first partially reflective surface 502a. If the first electrode is different from the partially reflective layer, it is also included. On top of the first partially reflective layer 502a is a dielectric layer 508a. On top of the dielectric layer 508a is a support portion 504*a* that is associated with other support portions to connect to 500*a* and 500*b*. Again, the second substrate 500*b* is associated with a second partially reflective layer 502*b* which is further associated with a dielectric layer 508*b*, and optionally a fourth electrode, assuming that the second partially reflective layer is not also serving as an electrode.

Between the partially reflective layers 502*b* and 502*a* is a cavity 498. Supported by the support stack 510 are two movable layers 506*a* and 506*b* that can move within the cavity 498. The cavity 498 is further divided into three subcavities 498*a*, 498*c*, and 498*b*. Cavities 498*a* and 498*b* are similar to cavities 498*a* and 498*b* depicted in FIG. 9. Movement of the movable layer 506*a* results in a change in size of the cavity 498*a* and 498*c*. Movement of the movable layer 506*b* results in a change in the size of the cavity 498*b* and 498*c*. The movable layers can move in a direction generally perpendicular to the plane of the first and second electrode layers 502*a* and 502*b* so as to change the distance between the surfaces of the movable layer 710 and 711 and the partially reflective layer 502*a* or 502*b* as appropriate. The moveable layer 506*a* is configured to move in direction 602, between position 800 and position 801*a*. The movable layer 506*b* is configured to move in direction 604, between position 802 and 801*b*. Moveable layer 506*a* comprises a second electrode and moveable layer 506*b* comprises a third electrode.

As above, the moveable layers 506*a* and 506*b* can be configured to have reflective surfaces 710 and 711, thereby allowing the moveable layer to serve as the reflective surface in the interferometric modulator. However, the reflective surfaces 710 and 711 can also be similar to those shown in FIGS. 7B-7E, e.g., separate from the deformable layer.

As will be appreciated by one of skill in the art, in the depicted embodiment, the partially reflective layers 502*a* and 502*b* and the moveable layer 506, 506*a*, and 506*b* are also configured to function as electrodes. However, in some embodiments, the electrode aspects of the layers is separated from the optical properties of the layer. Thus, dedicated electrode layers can be added as appropriate. Alternatively, or in addition, in some embodiments, the moveable properties of the layer(s) can be divided between various layers, instead of a single layer. Thus, additional layers can be included, or functions of current layers distributed to other layers, without departing from the present teachings.

As discussed, a layer can comprise sublayers and the various functions of the layer can be divided between particular sublayers. For example, the moveable layer 506 moves two reflective surfaces 710 and 711. In some embodiments, the reflective surfaces 710 and 711 are the moveable layer itself. Thus, a single layer can allow for movement and can reflect light. In other embodiments, these and other functions are divided among particular structures or layers. For example, there can be a deformable section of the device that allows movement of the reflective portions, and optionally a dedicated electrode layer. Another example of how some layers can further be specialized or adjusted is the partially reflective layer 502. As described above, the optical stack can comprise an electrode layer, a partially reflective layer and a transparent dielectric layer. In FIGS. 9 and 10, only the partially reflective layer and dielectric layer are shown. The electrode layer can either be a dedicated electrode layer, not shown, or it can be the same layer as the partially reflective layer. As used herein, movement described as occurring between the moveable or reflective surface and the partially reflective layer or dielectric layer is being driven by electrodes connected or associated with each of the layers.

As will be appreciated by one of skill in the art, additional layers or substrates can be added as appropriate. For example, in some embodiments, additional substrate layers can be added. This can be useful to add additional support or protection to substrate 500*b*. Such additional substrates can be adhered directly to substrate 500*b*, or, for example, added through a connection (e.g., adhesive) on the perimeter of the device.

B. Manufacture of Dual-Sided Interferometric Modulating Devices

The initial steps of manufacturing the embodiments depicted in FIGS. 9 and 10 are similar to that described above for the embodiment depicted in FIG. 1. The manufacturing process is also generally described in U.S. Pat. No. 5,835,255, the entirety of which is here incorporated by reference. Generally, one can deposit the first substrate 500*a*, a first support portion 504*a*, a first partially reflective layer 502*a*, a dielectric layer 508*a*, and a movable layer 506 with a reflective surface 710.

In addition to these steps, another layer or another support portion 504*b* is added (for example, deposited) above the moveable layer 506. This forms what will be a second upper cavity 498*b* on the other side of the moveable layer 506 from the lower cavity 498*a*. As will be appreciated by one of skill in the art, the cavity, when manufactured, will contain a sacrificial material, as described in greater detail above. The sacrificial material is removed after another layer(s) is deposited on top of it. Additionally, the movable layer 506 will have, or have connected to it, a second reflective surface 711. Following this, another dielectric layer 508*b* is added and then a second partially reflective layer 502*b* is added. Finally, the second substrate 500*b* can be added (for example by deposition) and can be, for example, SiO$_2$ on top of the second support portion or the 504*b* or the top of the support stack 510. Alternatively, the second substrate 500*b* can be attached to the device through the use of an epoxy. In a preferred embodiment, the epoxy is substantially optically transparent. The second substrate can be attached directly to the second partially reflective layer 502*b* or to additional support portions as shown in FIG. 9.

As above, the cavities 498, 498*a*, and 498*b* are the result from fabricating a solid set of layers where cavities are filled with a sacrificial layer such as molybdenum. After the layer is deposited, the sacrificial material is removed with a dry etch by exposing the layers to an etch gas. Of interest for these embodiments is the fact that two substrate layers 500*a* and 500*b* are be attached to a single support stack. This can require additional steps or slight modifications as two substrates can, in some cases, effectively seal the interior of the device and prevent the etchant from reaching the sacrificial material. As such, to fabricate the device in FIG. 9 or 10, in particular to achieve the additional cavity space(s) 498*b*, or 498*b* and 498*c* it can be beneficial to include small holes 720 in the substrate 500*b* or 500*a*. The holes need only be large enough and frequent enough to all a dry gas to contact the sacrificial material beneath which is originally filling the space 498*a* and 498*b*. In some embodiments, the second substrate 500*b* is not deposited on the surface of the second partially reflective layer or second electrode 502*a* but is instead attached to the electrode layer via a sufficiently transparent epoxy or glue; thus, the holes 720 need not be required.

Manufacturing the second embodiment, shown in FIG. 10, can be done in a similar manner. Again, one applies the additional support portion 504b, this time applying an additional movable layer 506b in addition to the first moveable layer 506a and an additional support portion 504c. Additionally the reflective surfaces 710 and 711 need only be present on the corresponding sides of the movable layer 506a and 506b so as to reflect light either from direction 510a or 510b respectively. In some embodiments, the movable layer is more complex, examples of which are in FIGS. 7b-7d where the reflective surface 14 is separate from the layer that directly allows movement 34, also known as a deformable layer. The deformable layer can be separate from the reflective surfaces, although the reflective layer will still move as desired. Again, the size of the support portions 504a and 504b is determined in part by the desired spacing or movement 602 (or 604) of the reflective surface 710 (or 711) compared to the partially reflective layer 502a (or 502b). The size of the support portion 504c is preferably large enough to prevent any unwanted interaction between movable layer 506a and 506b. As will be appreciated by one of skill in the art both movable layers 506a and 506b can be operated simultaneously in this embodiment to produce an image on the sides of the device. Thus, the spacing between the two movable layers 506a can take into account that electrical charges may be building up on the layers that could contribute to their interaction.

C. Method of Generating Two Images with a Single Device

After completion, the two-sided reflective display is viewable from both directions 512a and 512b. If the display is being viewed from direction 512a, then row and column electrodes associated with 506 and 502a (for example, the moveable layer and one partially reflective layer) are appropriately driven as described above to move the mirror between the relaxed central position 801 and a driven or actuated position 800, closer to the partially reflective layer 502a. This movement is shown as arrow 602. This actuated state results in cavity 498a being collapsed. In some embodiments, when light enters from direction 512a and the cavity 498a is not collapsed, light hits the reflective surface 710 and can pass through the partially reflective layer 502a and leave the cavity. When light enters from direction 512a and the cavity 498a is collapsed, light is prevented from leaving the cavity. In other embodiments, instead of light being absorbed, a selected light is reflected.

If the display is being viewed from direction 512b, then row and column electrodes associated with layers 506 and 502b are appropriately driven as described above to move the mirror between the relaxed position 801 and an actuated position 802, closer to the partially reflective layer 502b. This movement is shown as arrow 604. This driven state results in cavity 498b being collapsed. In some embodiments, when light enters from direction 512b and the cavity 498b is not collapsed, light hits the reflective surface 711 and can pass through the partially reflective layer 502b and leave the cavity. When light enters from direction 512b Image Page 3 and the cavity 498b is collapsed, light is prevented from leaving the cavity 498b. In other embodiments, instead of light being absorbed, a selected light is reflected.

Although FIG. 9 shows a symmetrical device with substantially identical cavity dimensions on both sides, it will be appreciated that non-symmetrical cavities can be created. Additionally, as will be appreciated by one of skill in the art, as the device has three positions in which it can rest, additional time or power can be required when transitioning between viewing from direction 512a and viewing from direction 512b, as the moveable layer 506 may have to transition through or to position 801, a step that is not required in devices with only two positions in which the moveable layer can be placed.

Although this display is viewable from both sides, it is driven to produce an image for only one side at a time, since producing an image on one side can produce a different resulting visual appearance on the opposite side. This is not a problem in many applications where a two-sided display is desirable, but only one side is viewed at a time. One example would be a clam-shell cell phone design where a hinged keypad cover has a display on both the outside and the inside. With a display as shown in FIG. 9 installed in this application, opening the phone can trigger rows 506 and columns 502a to produce the desired inside display, and when the phone is closed, operation of rows 506 and columns 502b occurs to produce the desired outside display. As will be appreciated by one of skill in the art, there are embodiments of use in which the single viewable layer can create two images simultaneously. For example, the moveable layer can transition between position 802 and 801 and position 801 and 800 quickly and frequently enough to generate images on both sides. Additionally, a differently colored image can appear on the opposite side of the device as well during use, even though the colors on the reverse side may not be ideal. Alternatively, a source of illumination can be used to illuminate each side of the display with a particular frequency of light, the two frequencies being offset from one another so that neither side is illuminated at the same time. By timing the display of an image on one side with the illumination on that side, and doing the same for the other side, it can appear as though two images were being produced at once.

The second embodiment, depicted in FIG. 10, operates in a similar fashion to two identical interferometric modulating devices, although there are some additional parameters to consider. When light enters from a first direction 512a, it passes through the first substrate 500a and the first partially reflective layer 502a and dielectric layer 508a and hits the reflective surface 710 connected to the movable layer 506a. The reflective surface 710 is positioned either at position 800 or at position 801a, depending on the current through the electrodes associated with layers 506a and 502a. In some embodiments, when the movable layer 506a is positioned next to the dielectric layer at position 800 and cavity 498a is collapsed, light is retained within the cavity. The movable layer 506a moves in direction 602 to determine the amount of light reflected and the image or signal produced for this section of the device. When the movable layer 506a is at position 801a and the cavity 498a is not collapsed, light again enters through the substrate 500a, passes through the partially reflective layer 502a and the dielectric layer 508a and is reflected by the reflective surface 710. In this position, in some embodiments, selected light is allowed to leave the cavity. In other embodiments, light is absorbed in this position.

Light entering from direction 512b passes through the substantially transparent substrate 500b the partially reflective layer 502b, and dielectric layer 508b. It is then reflected by reflective surface 711, which is associated with movable layer 506b. Again, movable layer 506b moves in direction 604 to change the size of cavity 498b, as well as cavity 498c. When the size of the cavity 498b is minimized, the cavity 498b is collapsed, and the movable layer is in position 802. In some embodiments, in the collapsed position, selected light entering through direction 512b is reflected by the device. In other embodiments, in the collapsed position, light entering through direction 512*b* is absorbed by the device. Likewise, in some embodiments, when the movable layer is in position 801*b*, and the size of the cavity 498*b* is not collapsed, the light is absorbed by the device. In other embodiments, when the cavity is not collapsed selected light is allowed to leave the device.

In this embodiment, the row/column array formed by electrodes associated with layers 502*a* and 506*a* can be driven completely separately from the row/column array defined by electrodes associated with layers 502*b* and 506*b*. This device can therefore simultaneously produce two separate reflective displays when viewed from opposite sides.

D. Additional Dual-Sided Displays

While the above devices can have a single support stack 510, single support stacks are not always required. In the embodiment depicted in FIG. 11, both sides of a single substrate 500*a* are used in a device that is viewable from two directions 512*a* and 512*b*. This device has support portions or stacks 510 and 610 that are separated by a substrate 500*a*.

The device can comprise a first substrate 500*a*, over which there is an electrode layer 502*a* and a first dielectric layer 508*a*. Above these layers is a support portion 504*a*, supporting a moveable layer 506, which has a reflective surface 711. On this moveable layer 506 is another support portion 504*b*, which supports a second dielectric layer (optional) 508*b* and a partially reflective layer 502*b*. On top of this is an optional substantially transparent second substrate 500*b*. On the opposite side of the first substrate 500*a* is a second electrode layer 602*a* and a third dielectric layer 608*a*. Above these layers is a third support portion 604*a*, supporting a moveable layer 606, which has a reflective surface 711. On top of this moveable layer 606 is a fourth support portion 604*b*, which supports a fourth dielectric layer (optional) 608*b* and a second partially reflective layer 602*b*. As noted below, this second partially reflective layer 602*b* need not serve as an electrode. On top of the second partially reflective layer 602*b* is an optional substantially transparent substrate 600. Additional substantially transparent substrates can be added for additional strength or protection.

In some embodiments, one difference between this embodiment and the embodiments above is that layers 502*a* and 602*a* are primarily electrodes for the displacement of the moveable layers 506 and 606. That is, layers 502*a* and 602*a*, need not have any particular optical properties as the optical interaction occurs between 502*b* and a reflective surface 711 or between 602*b* and reflective surface 710. Additionally, in some embodiments, layers 502*b* and 602*b* need not have any electrical properties because they do not need to attract the moveable layers 506 or 606. Rather, layers 502*b* and 602*b* can be selected for their optical characteristics alone. Additionally, in some embodiments, the support stack can primarily comprise two single, and separate, support portions 504*a* and 604*a* and any additional support portions 504*b* or 604*b* can be much smaller. This is because layers 504*b* and 604*b* can be tall enough to allow for the moveable layers 506 and 606 to operate. As will be appreciated by one of skill in the art, all of these differences do not need to be included in every embodiment. In some embodiments, holes are placed in the optional second and third substrates.

Figure 11:
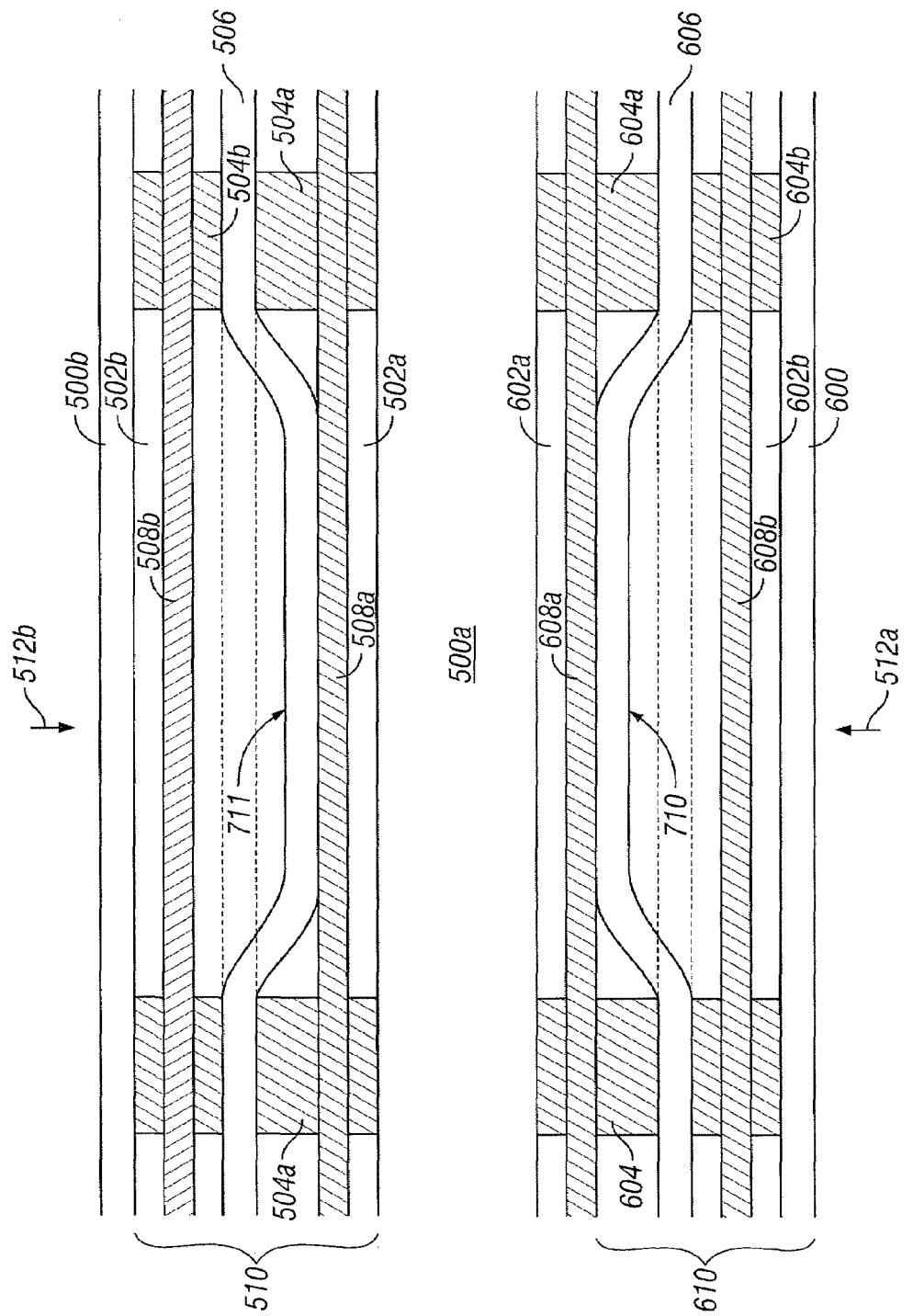
FIG. 11 is a cross section view of another embodiment that provides a viewing surface to both major surfaces of a modulator array.

In the embodiment in FIG. 11, two images can be created simultaneously. As will be appreciated by one of skill in the art, in such an embodiment, the optical properties of the system can be the reverse of the system described above. That is, when the moveable layer is actuated, the device will absorb light and generate a "dark" image. When the moveable layer is unactuated or relaxed, the device will reflect light and generate a "bright" image. Additionally, as will be appreciated by one of skill in the art, a method of manufacturing this device can be similar to that described above for the embodiments of FIGS. 9 and 10, differing primarily in the numbers and positions of the layers, substrates, or support portions. Additionally, as the function of layers 502*a*, 602*a*, 502*b*, and 602*b* can be partially different from the embodiments in FIGS. 9 and 10, as described above, one of skill in the art will appreciate how the materials used in these layers and steps can also be changed. As will be appreciated by one of skill in the art, any of the above discussed compositions or methods can be combined with this embodiment, as appropriate.

As will be appreciated by one of skill in the art, in some embodiments, substrate 500*a* need not be transparent to light. In some embodiments, substrate 500*a* comprises two or more substrates attached to one another.

We claim:

1. A light modulating device comprising:
   a first substrate substantially transparent to light;
   a second substrate substantially transparent to light, the second substrate substantially parallel to the first substrate and spaced from the first substrate;
   at least one support stack coupling the first substrate and the second substrate together;
   a first partially reflective layer coupled to the first substrate;
   a second partially reflective layer coupled to the second substrate, the second partially reflective layer substantially parallel to the first partially reflective layer and spaced from the first partially reflective layer, the first partially reflective layer and the second partially reflective layer defining a cavity therebetween;
   at least one movable layer supported by the at least one support stack, the at least one movable layer movable within the cavity along a direction generally perpendicular to the first and second partially reflective layers; and
   a first reflective surface and a second reflective surface coupled to the at least one movable layer to move within the cavity with the at least one movable layer, the first reflective surface and the first partially reflective layer defining a first sub-cavity therebetween, the second reflective surface and the second partially reflective layer defining a second sub-cavity therebetween.

2. The light modulating device of claim 1, wherein the at least one movable layer comprises a single movable layer.

3. The light modulating device of claim 2, wherein the support stack comprises a first support portion between the single moveable layer and the first partially reflective layer and a second support portion between the single moveable layer and the second partially reflective layer.

4. The light modulating device of claim 2, wherein, upon movement of the single movable layer towards the first partially reflective layer, the first sub-cavity decreases in size and the second sub-cavity increases in size.

5. The light modulating device of claim 2, wherein the first reflective surface comprises a first surface of the single movable layer and the second reflective surface comprises a second surface of the single movable layer.

6. The light modulating device of claim 2, wherein the single movable layer comprises at least one reflective portion, the first reflective surface comprises a first surface of the at least one reflective portion and the second reflective surface comprises a second surface of the at least one reflective portion.

7. The light modulating device of claim 1, wherein at least one of the first substrate and the second substrate comprises holes sufficiently large to allow an etchant gas to enter a volume between the first and second substrates.

8. The light modulating device of claim 1, wherein the at least one movable layer comprises a first movable layer and a second moveable layer, the first and second movable layers positioned between the two partially reflective layers.

9. The light modulating device of claim 8, wherein the first and second moveable layers do not contact one another when they move.

10. The light modulating device of claim 8, wherein the at least one support stack comprises a first support portion between the first moveable layer and the first partially reflective layer, a second support portion between the first moveable layer and the second movable layer, and a third support portion between the second moveable layer and the second partially reflective layer.

11. The light modulating device of claim 8, wherein the first movable layer comprises the first reflective surface and the second movable layer comprises the second reflective surface.

12. The light modulating device of claim 8, wherein, upon movement of the first movable layer towards the first partially reflective layer, the first sub-cavity decreases in size and the second sub-cavity does not change in size, and wherein, upon movement of the second movable layer towards the second partially reflective layer, the second sub-cavity decreases in size and the first sub-cavity does not change in size.

13. The light modulating device of claim 8, wherein the first reflective surface comprises a surface of the first movable layer and the second reflective surface comprises a surface of the second movable layer.

14. The light modulating device of claim 8, wherein the first movable layer comprises a first reflective portion, the first reflective surface comprising a surface of the first reflective portion, and wherein the second movable layer comprises a second reflective portion, the second reflective surface comprising a surface of the second reflective portion.

15. The light modulating device of claim 8, wherein a distance between the first reflective surface and the second reflective surface when the first movable layer and the second movable layer are unactuated is between about two and about 10 times a height of the first support portion.

16. The light modulating device of claim 1, wherein said light modulating device is a display system comprising:
   a first electronic display and a second electronic display comprising said light modulating device;
   a processor that is in electrical communication with said display, said processor being configured to process image data; and
   a memory device in electrical communication with said processor.

17. The display system as recited in claim 16, further comprising:
   a driver circuit configured to send at least one signal to said display.

18. The display system as recited in claim 17, further comprising a controller configured to send at least a portion of said image data to said driver circuit.

19. The display system as recited in claim 16, further comprising an image source module configured to send said image data to said processor.

20. The display system as recited in claim 19, wherein said image source module comprises at least one of a receiver, transceiver, and transmitter.

21. The display system as recited in claim 16, further comprising:
   an input device configured to receive input data and to communicate said input data to said processor.

22. A light modulating device comprising:
   a first substrate means and a second substrate means spaced from the first substrate;
   a first means for partially reflecting light positioned on said first substrate;
   a second means for partially reflecting light positioned on the second substrate;
   a means for reflecting light positioned and movable between said first means for partially reflecting light and said second means for partially reflecting light; and
   a means for coupling the first substrate and the second substrate together, wherein said means for coupling the first substrate and the second substrate further supports said means for reflecting light.

23. A method of creating two oppositely facing images, said method comprising:
   providing a device comprising a first partially reflective layer on a first transparent substrate, a second partially reflective layer on a second transparent substrate that is spaced from the first transparent substrate, and a single movable layer supported on a support stack, said support stack connecting the first partially reflective layer and the second partially reflective layer and positioning the single movable layer between the first and second partially reflective layers;
   moving the moveable layer in a direction generally perpendicular to the first and second partially reflective layers, thereby creating a first image viewable through the first transparent substrate; and
   moving the moveable layer in direction generally perpendicular to the first and second partially reflective layers, thereby creating a second image viewable through the second transparent substrate.

* * * * *

UNITED STATES PATENT AND TRADEMARK OFFICE
CERTIFICATE OF CORRECTION

| | | |
|---|---|---|
| PATENT NO. | : 7,304,784 B2 | |
| APPLICATION NO. | : 11/187129 | |
| DATED | : December 4, 2007 | |
| INVENTOR(S) | : Clarence Chui and Mark W. Miles | |

It is certified that error appears in the above-identified patent and that said Letters Patent is hereby corrected as shown below:

At column 21, line 44, claim 15, please delete, "claim 8" and insert -- claim 10 --.

Signed and Sealed this
Twenty-fourth Day of April, 2012

David J. Kappos
*Director of the United States Patent and Trademark Office*